(12) United States Patent
Yu et al.

(10) Patent No.: US 11,776,351 B2
(45) Date of Patent: *Oct. 3, 2023

(54) AUTONOMOUS FOOD STATION

(71) Applicants: Kent Yu, London (GB); Andrew Joseph Rojee, Derry, NH (US); Michael David Miller, Tewksbury, MA (US); Dov Z Glucksman, Winchester, MA (US)

(72) Inventors: Kent Yu, London (GB); Andrew Joseph Rojee, Derry, NH (US); Michael David Miller, Tewksbury, MA (US); Dov Z Glucksman, Winchester, MA (US)

(*) Notice: Subject to any disclaimer, the term of this patent is extended or adjusted under 35 U.S.C. 154(b) by 23 days.

This patent is subject to a terminal disclaimer.

(21) Appl. No.: 17/971,548

(22) Filed: Oct. 21, 2022

(65) Prior Publication Data

US 2023/0037435 A1  Feb. 9, 2023

Related U.S. Application Data

(63) Continuation-in-part of application No. 17/892,048, filed on Aug. 19, 2022, which is a continuation-in-part of application No. 17/683,329, filed on Feb. 28, (Continued)

(51) Int. Cl.
| | |
|---|---|
| *G07F 17/00* | (2006.01) |
| *G06Q 20/18* | (2012.01) |
| *G07F 9/10* | (2006.01) |
| *G07F 11/16* | (2006.01) |
| *G07F 11/10* | (2006.01) |
| *G07F 9/00* | (2006.01) |

(52) U.S. Cl.
CPC .......... *G07F 17/0078* (2013.01); *G06Q 20/18* (2013.01); *G07F 9/009* (2020.05); *G07F 9/105* (2013.01); *G07F 11/10* (2013.01); *G07F 11/163* (2020.05); *G07F 11/165* (2013.01)

(58) Field of Classification Search
CPC ........ A47J 39/006; A47J 47/01; G07F 11/165; G07F 17/0078; G07F 11/62; G07F 9/105; G06Q 20/18

See application file for complete search history.

(56) References Cited

U.S. PATENT DOCUMENTS

| 2,990,973 A | 7/1961 | Chazen |
| 3,291,035 A | 12/1966 | Ignelzi |

(Continued)

FOREIGN PATENT DOCUMENTS

| DE | 2443200 A1 | 3/1976 |
| JP | H03229394 A | 10/1991 |

(Continued)

*Primary Examiner* — Timothy R Waggoner
(74) *Attorney, Agent, or Firm* — Barcelo; Harrison & Walker, LLP; Joshua C. Harrison, Esq.

(57) ABSTRACT

A novel food station comprises a plurality of cubbies, each cubby sized to enclose a food portion container, and an externally accessible collection hatch large enough for the food portion container to pass therethrough. A heating system can controllably heat the food portion container within a selected one of the cubbies, independently of an operation of the heating system the other cubbies. A cooling system can perform cooling within a subset of cubbies that includes at least the selected cubby. An internal transport system includes an end effector that temporarily couples to the portion container carrier of the selected cubby and controllably moves the food portion container carrier within the food station to the collection hatch. A control system includes a memory that controls the heating and controls the movement of the internal transport system.

16 Claims, 31 Drawing Sheets

Related U.S. Application Data

(63) 2022, now Pat. No. 11,462,072, which is a continuation-in-part of application No. 17/387,936, filed on Jul. 28, 2021, now abandoned.

(60) Provisional application No. 63/105,056, filed on Oct. 23, 2020, provisional application No. 63/066,904, filed on Aug. 18, 2020.

(56) References Cited

U.S. PATENT DOCUMENTS

| | | | |
|---|---|---|---|
| 3,333,666 | A | 8/1967 | Murray et al. |
| 3,343,479 | A | 9/1967 | Wassberg |
| 3,386,550 | A | 6/1968 | Murray et al. |
| 3,397,817 | A | 8/1968 | Smith |
| 3,416,429 | A | 12/1968 | Torsiello et al. |
| 3,443,509 | A | 5/1969 | Sandy |
| 3,482,509 | A | 12/1969 | Gardner |
| 3,534,676 | A | 10/1970 | Rubino |
| 3,615,713 | A | 10/1971 | Stevenson |
| 3,620,341 | A | 11/1971 | Gardner |
| 3,866,795 | A | 2/1975 | Urano |
| 4,005,745 | A | 2/1977 | Colato et al. |
| 4,180,125 | A | 12/1979 | Schulz et al. |
| 4,217,476 | A | 8/1980 | Bellavoine |
| 4,398,651 | A | 8/1983 | Kumpfer |
| 4,438,683 | A | 3/1984 | Bartfield |
| 4,592,485 | A | 6/1986 | Anderson et al. |
| 4,671,425 | A | 6/1987 | Knoll |
| 4,722,267 | A | 2/1988 | Galockin et al. |
| 4,784,292 | A | 11/1988 | Johndrow et al. |
| 4,881,590 | A | 11/1989 | Meier |
| 4,996,405 | A | 2/1991 | Poumey et al. |
| 5,144,879 | A | 9/1992 | Alessi |
| 5,454,427 | A | 10/1995 | Westbrooks, Jr. et al. |
| 5,487,488 | A | 1/1996 | Cho |
| 5,499,707 | A | 3/1996 | Steury |
| 5,503,300 | A | 4/1996 | Prescott et al. |
| 5,586,686 | A | 12/1996 | Bustos et al. |
| 5,589,093 | A | 12/1996 | Chen |
| 5,845,263 | A | 12/1998 | Camaisa et al. |
| 5,868,195 | A | 2/1999 | Westbrooks, Jr. |
| 6,102,162 | A | 8/2000 | Teicher |
| 6,415,950 | B1 | 7/2002 | Robrechts |
| 6,464,104 | B1 | 10/2002 | Waddell |
| 6,513,677 | B1 | 2/2003 | Sorensen et al. |
| 6,755,322 | B1 | 6/2004 | Herzog et al. |
| 7,093,755 | B2 | 8/2006 | Jordan et al. |
| 7,137,529 | B2 | 11/2006 | Martinelli et al. |
| 7,303,093 | B2 | 12/2007 | Ward |
| 7,451,891 | B2 | 11/2008 | Carter et al. |
| 7,568,618 | B1 | 8/2009 | Scutellaro et al. |
| 7,647,865 | B2 | 1/2010 | Vidondo et al. |
| 7,837,059 | B2 | 11/2010 | Hieb et al. |
| 8,162,174 | B2 | 4/2012 | Hieb et al. |
| 8,261,980 | B1 | 9/2012 | Scutellaro et al. |
| 8,534,494 | B2 | 9/2013 | Black, Jr. et al. |
| 8,651,324 | B2 | 2/2014 | Borghi |
| 9,361,746 | B2 | 6/2016 | Otzen |
| 9,449,208 | B2 | 9/2016 | Luk et al. |
| 9,454,867 | B2 | 9/2016 | Jin |
| 9,547,851 | B2 | 1/2017 | Brown |
| 9,784,497 | B2 | 10/2017 | Wang et al. |
| 9,854,931 | B2 | 1/2018 | Rocklinger et al. |
| 10,026,254 | B1 | 7/2018 | Lad |
| 10,354,479 | B2 | 7/2019 | Huang |
| 10,431,115 | B2 | 10/2019 | Staveley |
| 10,546,445 | B2 | 1/2020 | Lopez et al. |
| 10,654,394 | B2 | 5/2020 | Goldberg et al. |
| 10,713,879 | B2 | 7/2020 | Yu |
| 10,885,492 | B2 | 1/2021 | Goldberg et al. |
| 11,462,072 | B2* | 10/2022 | Glucksman et al. ... G07F 7/069 |
| 2003/0088469 | A1 | 5/2003 | Leifer |
| 2004/0015403 | A1 | 1/2004 | Moskowitz et al. |
| 2005/0059414 | A1 | 3/2005 | Mahmoodi et al. |
| 2010/0280895 | A1 | 11/2010 | Mottola |
| 2011/0139472 | A1 | 6/2011 | Sawh et al. |
| 2012/0103562 | A1* | 5/2012 | Alexander ......... A47G 19/2288 165/64 |
| 2013/0067375 | A1 | 3/2013 | Kim et al. |
| 2015/0290795 | A1 | 10/2015 | Oleynik |
| 2016/0019629 | A1 | 1/2016 | Briancon et al. |
| 2017/0206733 | A1 | 7/2017 | Yu |
| 2017/0221296 | A1 | 8/2017 | Jain et al. |
| 2019/0043301 | A1 | 2/2019 | Yu |
| 2019/0050797 | A1 | 2/2019 | Goldberg et al. |
| 2019/0050798 | A1 | 2/2019 | Goldberg et al. |
| 2019/0050799 | A1 | 2/2019 | Goldberg et al. |
| 2019/0050800 | A1 | 2/2019 | Garden |
| 2019/0050801 | A1 | 2/2019 | Garden |
| 2019/0050802 | A1 | 2/2019 | Garden |
| 2019/0050803 | A1 | 2/2019 | Garden |
| 2019/0050804 | A1 | 2/2019 | Garden |
| 2019/0050951 | A1 | 2/2019 | Goldberg et al. |
| 2019/0050952 | A1 | 2/2019 | Goldberg et al. |
| 2019/0051083 | A1 | 2/2019 | Goldberg et al. |
| 2019/0051086 | A1 | 2/2019 | Goldberg et al. |
| 2019/0051087 | A1 | 2/2019 | Goldberg et al. |
| 2019/0051090 | A1 | 2/2019 | Goldberg et al. |
| 2019/0163710 | A1 | 5/2019 | Haghighat Kashani et al. |
| 2019/0385118 | A1 | 12/2019 | Deemter |

FOREIGN PATENT DOCUMENTS

| | | | |
|---|---|---|---|
| JP | 3152471 | B2 | 4/2001 |
| JP | 3271462 | B2 | 4/2002 |
| WO | 2017087983 | A1 | 5/2017 |
| WO | 2019/152580 | A1 | 8/2019 |

* cited by examiner

AUTONOMOUS FOOD STATION

CROSS-REFERENCE TO RELATED APPLICATIONS

This application claims priority under 35 USC § 120 as a continuation-in part to U.S. Pat. Application 17/892,048 filed 2022-08-19 (pending), which claims priority as a continuation-in part to U.S. Pat. Application 17/683,329 (issued as U.S. Pat. 11,462,072), which claims priority as a continuation-in part to U.S. Pat. Application 17/387,936 (abandoned), and thereby this application also claims priority to U.S. Provisional Pat. Application 63/066,904 filed 2020-08-18, and to U.S. Provisional Pat. Application 63/105,056 filed 2020-10-23. The foregoing claims to priority are not an incorporation by reference.

BACKGROUND

Food vending machines are typically stocked with a finite selection of consumable food items, each with an indication of its price. Customers can insert payment and select one of the stocked items for purchase and consumption at the stored temperature, but if heating of the food item is required the customer must do that himself subsequently and remotely. The customer does not directly affect the selection or timing of the food items that are stocked in contemporary food vending machines, but rather the stocking is done on a regular basis without customer input. In the case of a conventional food vending machine, the maximum number of food item choices available to the customer is limited by the size and architecture of the machine; the customer can choose only items that are regularly stocked and therefore physically present within the machine at the time of the customer's selection.

Lockers have been disclosed for temperature-controlled storage and provision of heated food items, but those require selective customer access to many external doors, i.e., an access-controlled external door for each stored and vended food item. Such a requirement can cause the customer-accessible area of the lockers to be excessively large for many venues. Moreover, the number of external locker doors is undesirably limited (and therefore the number of food choices is also undesirably limited) because of a practical height restriction: it is inconvenient and potentially unsafe for customers to reach overhead to retrieve hot foods. Hence, locker systems have an undesirably limited expandability and capacity in many locations because they are inherently only one row deep (for customer access) and practically limited to being not more than approximately 6 feet tall.

SUMMARY

The inventors of the current application recognized a need in the art for an improved food storing and selling system, or a portion thereof, that may in certain embodiments: (1) help consumers to remotely pre-order desired food items or meals from a large menu of hot or cold choices, the number of menu options not being limited by the capacity of a vending machine; (2) autonomously store, cool, heat, and provide each chosen food item independently at different scheduled times and temperatures; (3) store and sell a sufficient variety and quantity of cold or hot food items without requiring an excessively large customer-accessible area; (4) relax the time constraints for preparing and delivering hot meals to consumers, for example enabling such meals to be prepared and delivered well before consumption rather than immediately before consumption; and/or (5) improve economies of scale for production and delivery of hot meals. Certain embodiments of the autonomous food station disclosed herein can help meet one or more of the foregoing needs.

BRIEF DESCRIPTION OF THE DRAWINGS

For the purposes of illustration, there is shown in the drawings exemplary embodiments, but the claims define their own bounds and are not limited to the specific embodiments disclosed or shown.

DETAILED DESCRIPTION OF EXEMPLARY EMBODIMENTS

Figure 1:
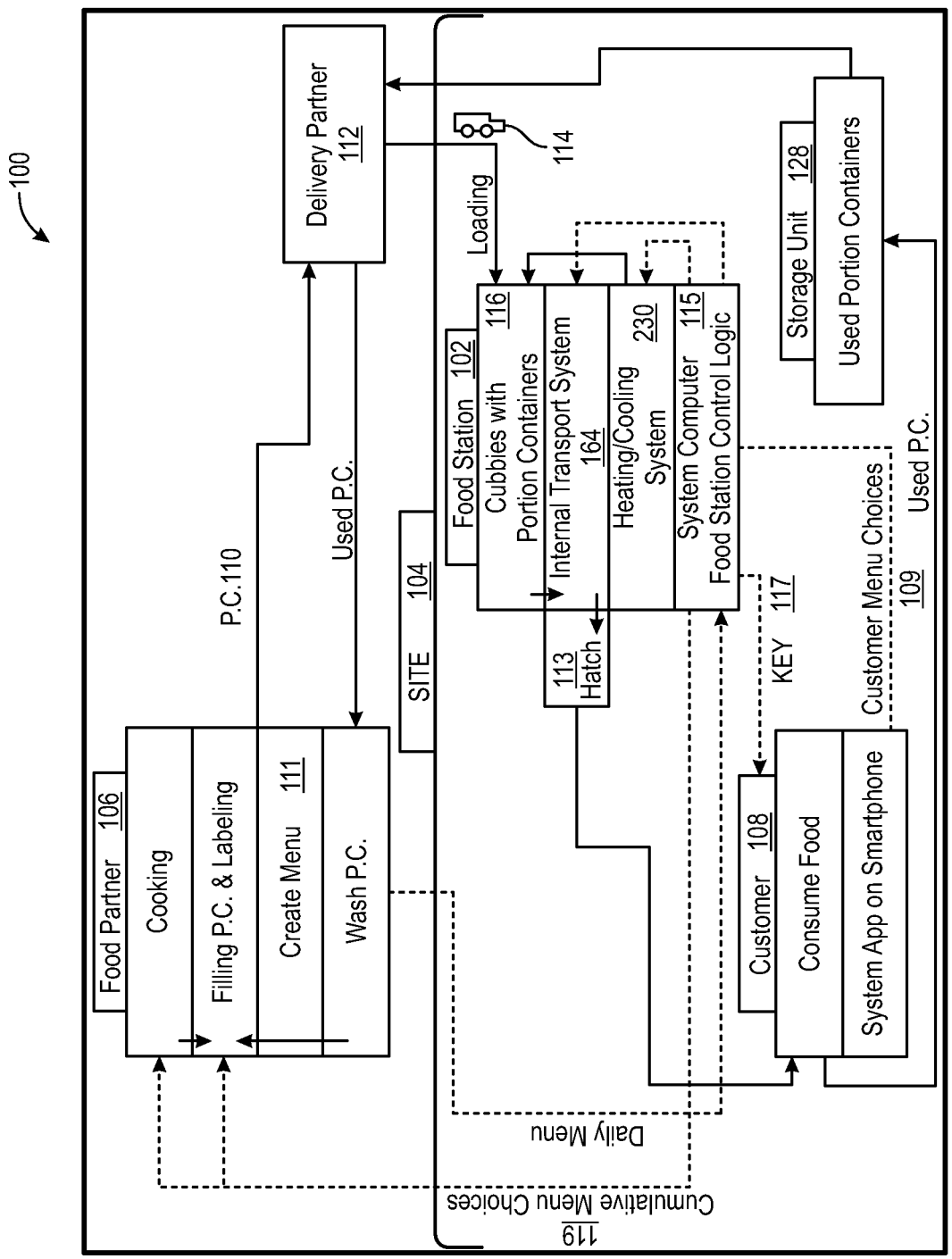
FIG. 1 is a flow chart of various example interactions or communications that an embodiment of a novel autonomous food station may have with a customer, food partner, and delivery partner.

FIG. 1 is a flow chart 100 of various example interactions or communications that an embodiment of a novel autonomous food station 102 may have with a customer 108, food partner 106 (e.g. food provider), and delivery partner 112. In the embodiment of FIG. 1, the customer 108 may interact with the food partner 106 or the autonomous food station 102 when ordering or paying for a consumable food item or meal, collecting the meal, or returning a portion container (P.C.) 110 after use. The delivery partner 112 may interact with the food partner 106 when picking up or returning portion containers 110, or interact with the autonomous food station 102 when loading them into or collecting them from the autonomous food station 102. The food partner 106 may interact with the autonomous food station 102, customer 108, or delivery partner 112, when providing or updating menus, receiving orders of or payment for customer or cumulative menu choices 109, 119, or coordinating delivery or retrieval of portions containers 110.

The autonomous food station 102 at a particular site 104 may be owned by the food partner 106. Alternatively, the owner or operator of the autonomous food station 102 may hire or otherwise contract with the food partner 106 to prepare and supply consumable meals or snacks. More than one food partner 106 may prepare and supply meals to any given autonomous food station 102, so that a customer 108 may have the option to purchase consumable snacks and meals of numerous types. The food partner 106 may be a well-known restaurant whose brand more readily attracts consumers, a commissary, etc. The owner may be a franchisee who operates one or more autonomous food stations for a franchiser who controls what consumable food items are offered and partially profits from their sale. The food partner might profit from the sale of meals to the franchisee and the franchisee may profit from the sale of meals to end customers 108 via the autonomous food station 102. The owner of the autonomous food station 102 may pay a location owner (e.g. the owner of the site 104) a rental fee or a share of the profits for being allowed to place the autonomous food station 102 in one or more convenient location(s) owned by the location owner.

Convenient locations for the autonomous food station 102 may include places frequented by consumers who are in the same vicinity day after day such as apartment building lobbies, office buildings, office lunchrooms, workplace lobbies, university cafeterias, hospital cafeterias, taverns, etc. Numerous autonomous food stations like the autonomous food station 102 may be conveniently positioned around a neighborhood, town, or city. The autonomous food station 102 could be installed in private or public locations, such as downtown business centers, ballparks, beaches, campgrounds, other recreational venues, or airport terminals or train stations where consumers could pick up a pre-ordered meal before boarding.

Either the food partner 106 or the owner of the autonomous food station 102 may offer the same menu for extended periods or may periodically (e.g. weekly) generate a new menu with a range of meal choices (a steak dinner, soup and sandwich, burger and fries, snacks, etc.), or with a range of meal components (proteins, sides, vegetables, etc.), or a range of cuisine ethnicities (Italian, Chinese, Mexican, etc.), or with a range of desserts (hot apple pie, cold desserts, room temperature pastries, etc.). A customer 108 (e.g. the ultimate consumer) reviews and selects consumable food items from the menu(s) 111 offered by one or more food partners 106.

The autonomous food station 102 may include software and hardware for enabling consumers to order and pay for a desired food consumable (e.g. meal, snack, salad, dessert, etc.) from an extensive menu of hot or cold choices and from one or more food partners 106. For example, the autonomous food station 102 may include a system computer and food station control logic 115. The food station control logic 115 may be a control system having conventional microelectronics, software and/or firmware, conventional volatile and/or non-volatile memory, and that is conventionally wired and programmed to be capable of controlling the electromechanical actuators and heating and cooling systems of the autonomous food station 102.

The customer 108 may select and order a customer menu choice 109 in a variety of ways. For example, an app may be downloaded to the customer's smartphone for registration or unregistered interaction with one or more autonomous foods stations 102 and/or an on-line site. The app may query the customer's location and then query, store, or update information about various autonomous food stations 102 in the customer's region, or available menus from which the customer 108 may choose food items. The app may allow the customer 108 to register and input relevant personal information, payment information, food type preferences, dietary restrictions and allergies, most common location of use ("home base"), etc. The registered customer 108 may be required to select an account password to verify the customer's identity to the app, and may be assigned a customer identification key 117 for verify the customer's identity to the autonomous food station 102.

In certain embodiments, the autonomous food station 102 may include a user interface allowing the customer 108 to input customer identification information (e.g. the customer identification key 117) to receive or place a food order at the site 104. In this way, for example, the customer 108 might conveniently place tomorrow's food order while picking-up today's meal. Accordingly, the user interface of the autonomous food station 102 might prompt the customer 108 such as "Would you like to place another order," or "10% off if you place another order within the next 15 minutes," etc., thereby promoting additional sales before the customer 108 has eaten (and so is presumably hungry). Alternately, the customer 108 may be able to order meals via a call-in phone number.

The customer 108 may communicate an order of customer menu choice 109 in advance of the desired time of receipt of the food consumable, for example the day before the desired day of receipt (Day 0). For example, as described above, the customer 108 may communicate the customer menu choice 109 via a call-in number, or remotely using a smartphone app or on-line site, or via a system program and user-interface on the autonomous food station 102. The customer's order may be stored in the autonomous food station control logic 115 and the customer may be provided with a customer identification key 117 (e.g. a security code) for customer identity verification at the autonomous food station 102. The software may allow customers to reschedule the time of receipt in advance, for example prerequisite upon using the customer identification key 117 to verify that rescheduling is being done by the customer and not another person.

Cumulative customer menu choices 119 are preferably transmitted to the food partner 106 who then prepares and places each selected food consumable into a portion container 110. The autonomous food station 102 preferably allows delivery of the consumable from the food partner 106 at an earlier time, and then provides the consumable to the customer 108 in a ready-to-eat condition in the sealed portion container at or around the later time. Before the desired time of receipt, for example on the morning of Day 0, the portion containers 110 may be picked up from the food partner 106 by a delivery partner 112, and delivered to the autonomous food station 102, for example in a refrigerated vehicle 114. The autonomous food station 102 may enable loading of pre-ordered consumables from one or more providing food partners 106 into storage chambers (i.e. cubbies). In certain embodiments, the portion containers 110 may be randomly loaded into individual cubbies 116 of the autonomous food station 102.

The autonomous food station 102 preferably includes a heating and cooling system 230 to enable the customer 108 (e.g. a consumer) to collect the chosen food consumable in a fresh and heated or cooled state at a convenient location at a chosen future time. For example, the heating and cooling system 230 of the autonomous food station 102 includes equipment to preferably enable each cubby 116 to store a consumable at a refrigerated temperature that can maintain the freshness of that consumable until an appropriate time before receipt by the customer 108, and to then begin heating the consumable so that it will be ready to consume when received, for example by beginning to heat a food portion container in a cooled cubby at a scheduled time, or moving a food portion container from a cooled cubby to a heated cubby at a scheduled time.

Each portion container is preferably provided with a label 124 that can be read and its associated data stored in the memory of the food station control logic 115. For example, the associated data may be used by the control system of the food station control logic 115 to determine the temperatures and heating and cooling schedule and durations for the cubby 116 into which the portion container 110 is loaded. In that way, the labels 124 of each of the portion containers 110 loaded into the autonomous food station 102 may provide the information needed for the food station control logic 115 to properly control the temperature versus time for each of the cubbies 116, independently of the other cubbies 116. Alternatively, some the information may be provided via conventional microelectronics that can communicate via an internet connection, for example via the internet from the food partner 106, or alternatively may be input directly at the site 104 by the delivery partner 112 via a user interface of the autonomous food station 102 itself.

In this way, the autonomous food station 102 may enable the food partner 106 to prepare and supply meals that are intended to be served warm or hot to the autonomous food station 102 well in advance of regular mealtimes or expected receipt by the customer 108, thereby relaxing the time constraints for preparing and delivering warm or hot meals to consumers, for example enabling such meals to be prepared and delivered well before consumption rather than immediately before consumption.

The autonomous food station 102 also preferably includes an internal transport system 164 for moving the portion container 110 corresponding to customer menu choice 109 to a collection hatch 113 of the autonomous food station 102 at the demand of the identified customer 108 at or around the scheduled time of receipt, and allows access to the collection hatch 113 by the customer 108 after verification of the customer identification key 117. In certain embodiments the collection hatch 113 may be located at a height determined to be most convenient for the average customer. Because internal transport of the portion containers 110 is accomplished by the internal transport system 164 to a conveniently located collection hatch 113, the autonomous food station 102 may store and sell a large variety and quantity of cold or hot food items without requiring an excessively large customer-accessible area and without requiring customers to access lockers that are too high or out of reach. For example, because of the internal transport system 164, the customer need not be provided direct access to everything that is stored but rather only the collection hatch 113.

The information on the label 124 of the portion container 110, for example cooling instructions for storage or heating instructions for preparation of the consumable food item therein, the identification (e.g. number) of the cubby 116 in which that portion container '110 is stored, and the customer identification key 117, may be scanned or otherwise conventionally input and stored in the food station control logic 115. After the label 124 of each portion container 110 has been scanned, the food station control logic 115 may command the system to refrigerate the cubbies 116 containing portion containers 110 to maintain a temperature suitable for extended safe storage of cooked food (e.g. 37° F.), for example to reduce any adverse effect upon the taste and flavor of the food while the consumable is stored.

If the portion container 110 holds a meal to be delivered warm or hot, then the food station control logic 115 may command heating of the food portion container in its corresponding cubby 116, or movement of the food portion container from a cooled cubby to a heated cubby, sufficiently in advance of the scheduled or amended time for pick-up by the customer 108 (e.g. one hour prior, or a period sufficient to achieve an appropriate food serving temperature such as 140° F.), and keep it at that temperature until receipt by the customer 108. If the food is to be served cold, it may be maintained at the refrigerated temperature. If the food is to be served at room temperature, it may be warmed only to room temperature.

Customers arriving at the site 104 of the autonomous food station 102 to pick up their food preferably will first identify themselves to the food station control logic 115 using their customer identification key 117. Recognizing the customer 108, the food station control logic 115 may then command the internal transport system 164 to internally convey the corresponding portion container 110 from its cubby 116 to the collection hatch 113. The food station control logic 115 preferably keeps track of which cubbies 116 no longer contain portion containers 110, and stops heating or cooling in those cubbies 116 for improved energy efficiency. The food station control logic 115 may also recognize when a customer has not collected her portion container 110 before the expiration of some period after the requested pick-up time, and may then send a reminder, such as by call or text to the customer's smartphone, by email, or via a smartphone app. Based on feedback which may then be provided by the customer 108, the food station control logic 115 may keep the food at its heated temperature for an additional specified and biologically safe period of time, chill the food to avoid spoilage and reheat if and while biologically safe, or chill the portion container 110 and prompt the food delivery partner 112 to remove the un-claimed portion container 110 during the next delivery and retrieval visit to site 104 (e.g. for subsequent disposal of its contents and cleaning for reuse by the food partner 106).

After customers 108 have consumed their food, they may place the empty portion containers 110 into a storage unit 128, where they may be kept at a desired temperature and humidity (e.g. moist to facilitate future cleaning). The delivery partner 112 may later retrieve them (e.g. the following morning) from the storage unit 128, for example to return them to the food partner 106 to be washed and sterilized for re-use. The storage unit 128 may be a large container external of the autonomous food station 102 intended merely to collect the empty portion containers 110 in a sanitary manner apart from the autonomous food station 102. Alternatively, the storage unit 128 may be an internal portion and function of the autonomous food station 102. If internal, the storage unit 128 may have means to move, scan, and identify the returned portion container 110. Whether internal or external, the customer 108 may ultimately receive a return deposit or credit against his account once the returned portion container 110 is scanned and identified after return. If the portion containers 110 are disposable, compostable, or recyclable, the portion containers may be marked with disposal instructions or icons that guide the customer 108 accordingly.

Figure 2:
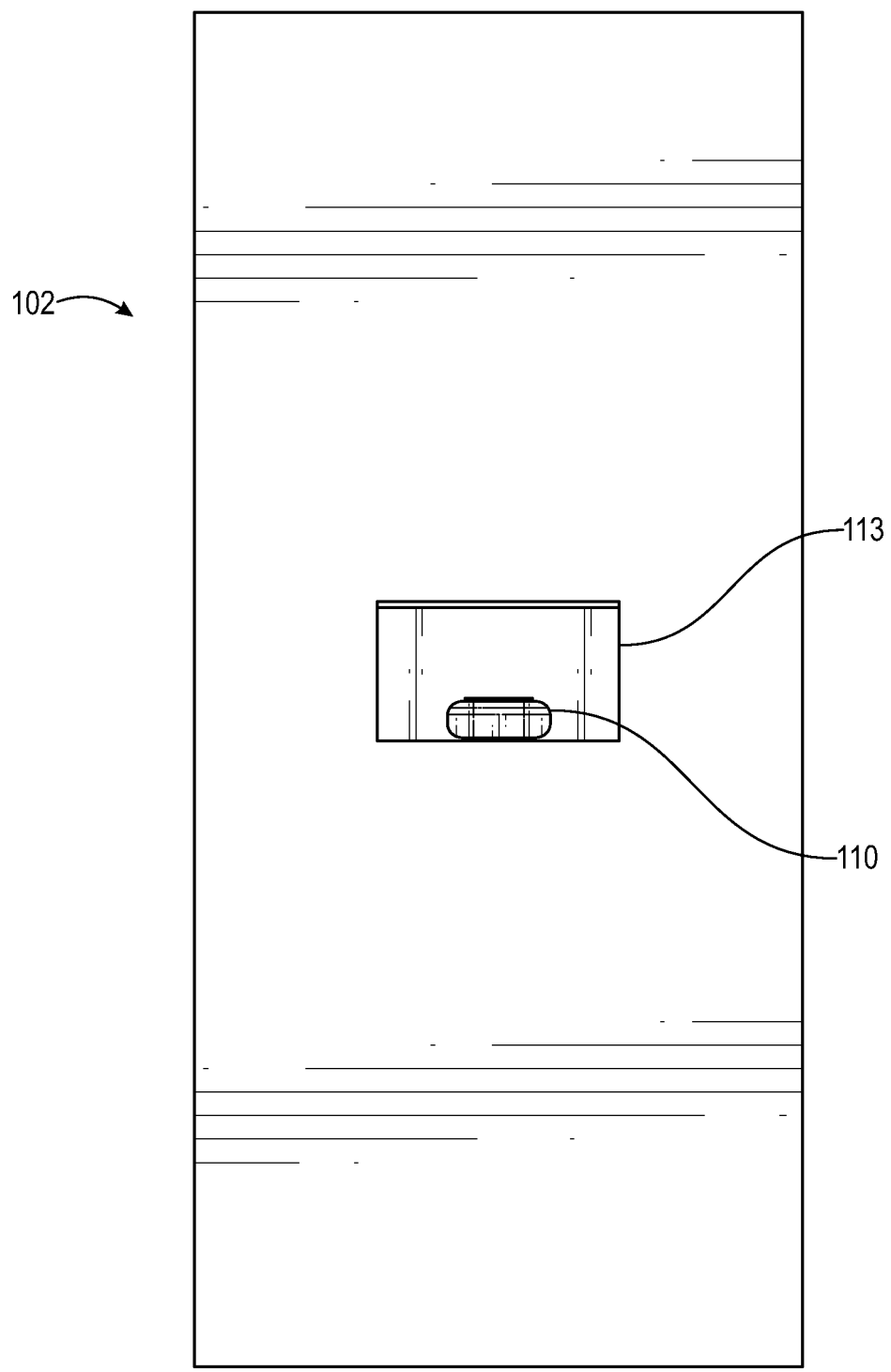
FIG. 2 is a front view of an autonomous food station according to an example embodiment of the present invention.
Figure 3:
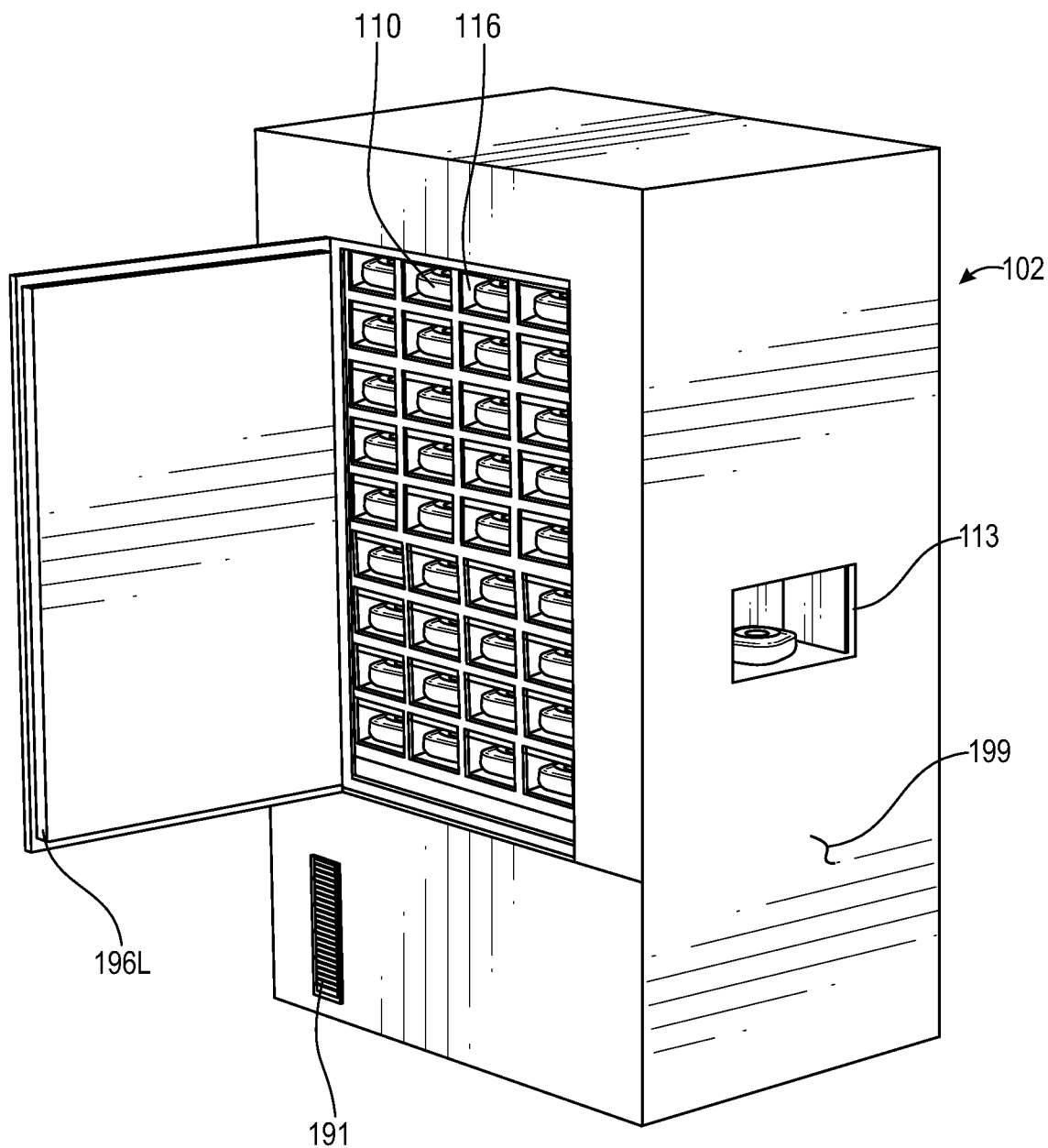
FIG. 3 is a left perspective view of the autonomous food station of FIG. 2, with a left cubby access panel opened from the exterior.
Figure 4:
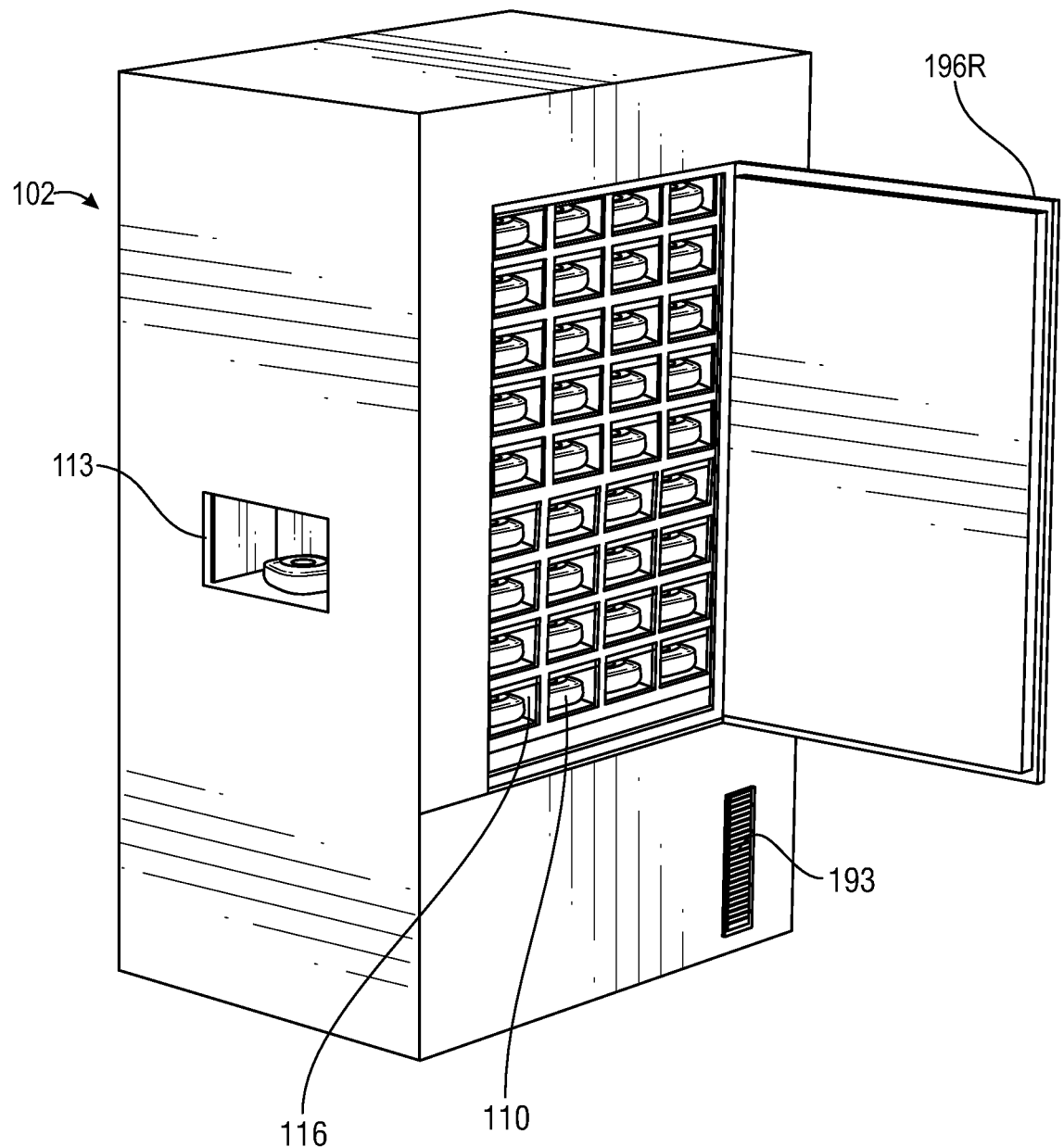
FIG. 4 is a right perspective view of the autonomous food station of FIG. 2, with a right cubby access panel opened from the exterior.
Figure 5:
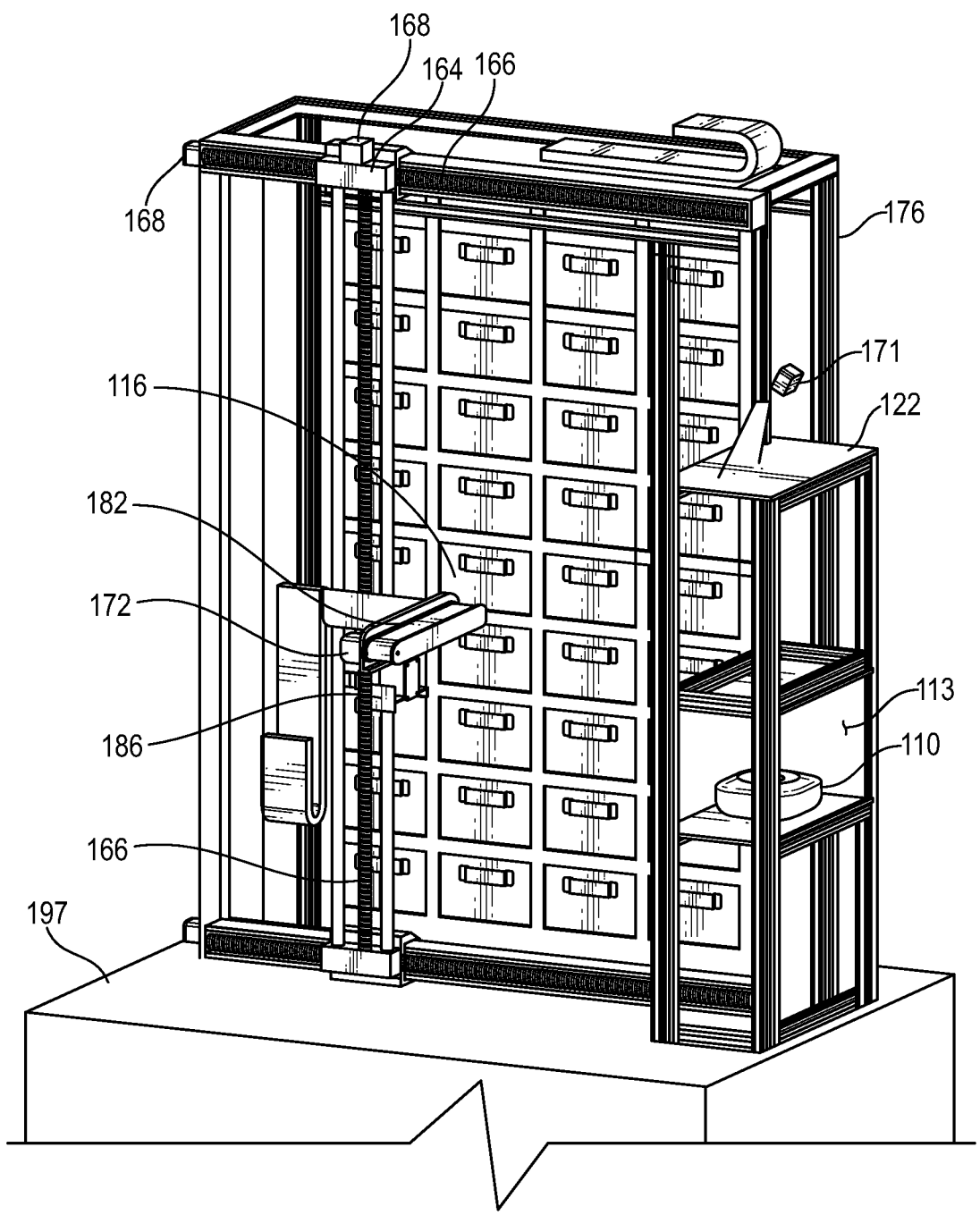
FIG. 5 is a perspective view of an example internal transport system for movement of portion containers from the right sided cubbies of an autonomous food station, according to an embodiment of the present invention.

FIG. 2 is a front view of an autonomous food station 102 according to an example embodiment of the present invention. FIG. 3 is a left perspective view of the autonomous food station 102, with a thermally insulated left cubby access panel 196L opened from the exterior. FIG. 4 is a right perspective view of the autonomous food station 102, with a thermally insulated right cubby access panel 196R opened from the exterior. FIG. 5 is a perspective view of an example internal transport system 164 for movement of portion containers 110 from the right sided cubbies 116 of the autonomous food station 102.

In certain embodiments, the autonomous food station 102 may have a rectangular cuboid shape, for example of sufficient width and height to enclose 72 cuboid cubbies 116 for storing food portion containers 110, while preferably (but not necessarily) fitting through a standard sized commercial doorway. For example, in a particular embodiment, such an autonomous food station 102 may be approximately 35" wide, 78" tall, and 49" deep. In certain embodiments the collection hatch 113 may be positioned approximately halfway up the height of the station to ensure convenient customer access thereto. Each of the left and right cubby access panels 196L and 196R is preferably large enough to provide visibility and external access to the cubbies 116 for loading and cleaning, and is preferably insulated to optionally serve as the outside wall of the cubbies 116.

A base compartment 197 forming the lower portion of the autonomous food station 102 may be dedicated to house the cooling and heating system and various controls. It may also house the system computer and control logic 115, and support the rest of the autonomous food station 102, including the internal transport system 164 and the cubbies 116. The walls 199 of the autonomous food station 102 may include thermal and acoustic insulation and be structural capable of carrying the weight of the rest of the autonomous food station 102. The walls 199 may optionally include left and right base compartment air vents 191, 193.

The delivery partner 112 may have a key or access code to externally open the left and right cubby access panels 196L and 196R to load food items or collect unused food items. As will be described subsequently herein, the autonomous food station 102 may include an identification site 122 with a scanner 171 to read a label 124 or code on each portion container 110, so that the food station control logic 115 can automatically associate each portion container 110 with its corresponding cubby 116 (i.e. internal location). In embodiments where the autonomous food station 102 is so equipped, the delivery partner 112 may load each new portion container 110 (one per cubby 116) randomly, without concern for specific positions or following a specific order. After all portion containers 110 are loaded into their cubbies 116, the internal transport system 164 may be used to transport each portion container 110 to the identification site 122 to have its label 124 scanned, and then be returned to its cubby 116. The food station control logic 115 preferably associates in its memory the identified meal with the associated customer identification key 117 and its corresponding cubby 116 - now a known location for that meal. Each meal may have a meal preparation instruction specific thereto. This instruction also may be stored in the memory of the food station control logic 115, or may be provided to the logic by a code on the label 124. For example, a soup may be best served at 160° F. while a grilled cheese sandwich may be best served at 130° F., and a tuna sandwich may be best served at room temperature. Such serving temperature preparation instructions may be associated with the corresponding cubby 116 by the food station control logic 115.

Figure 6:
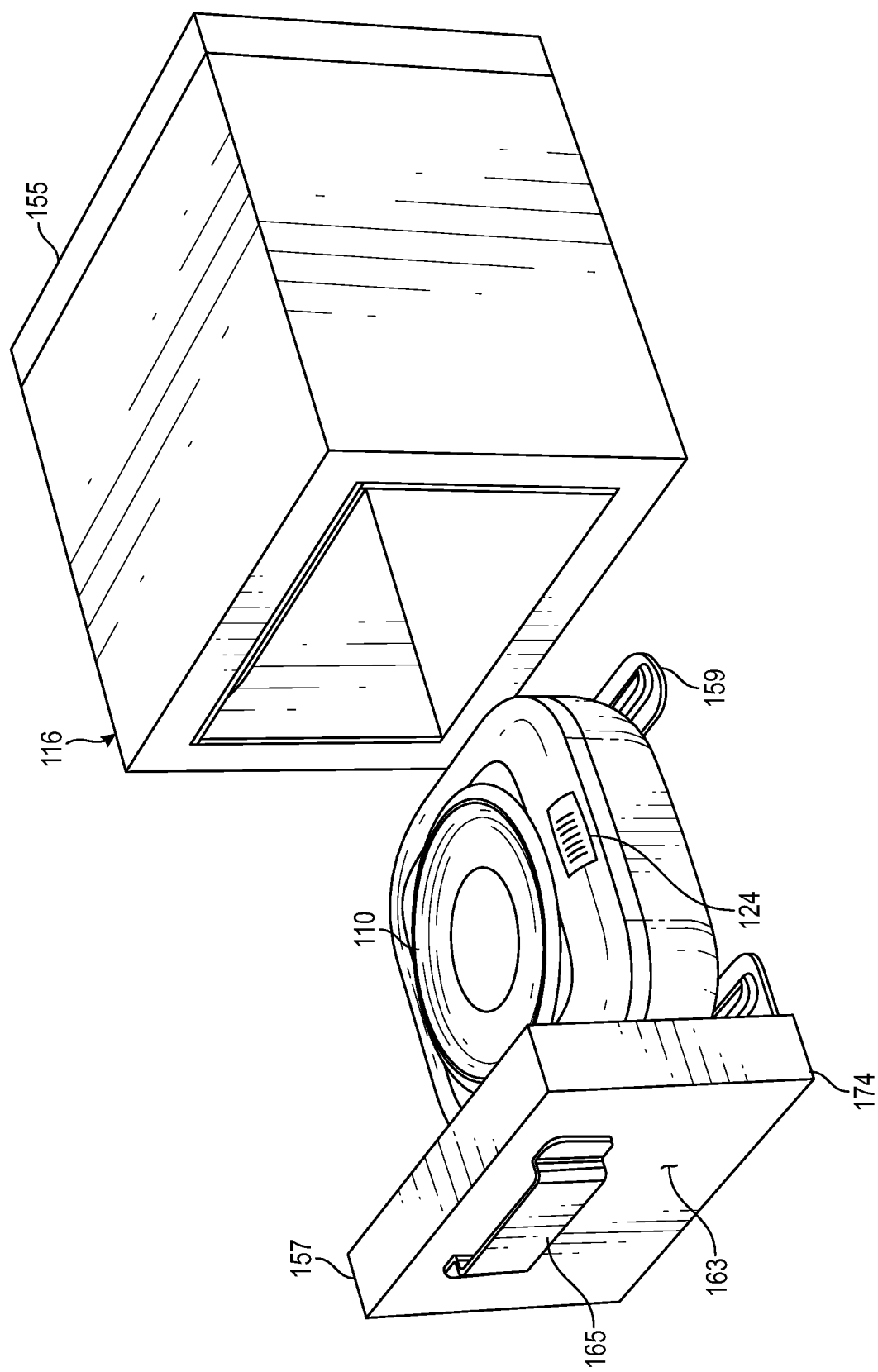
FIG. 6 is an exploded perspective view of a cubby of an autonomous food station according to an example embodiment of the present invention, and a food portion container that can be used with the autonomous food station, after opening the cubby from within the interior of the autonomous food station to remove the portion container carrier and portion container.
Figure 7:
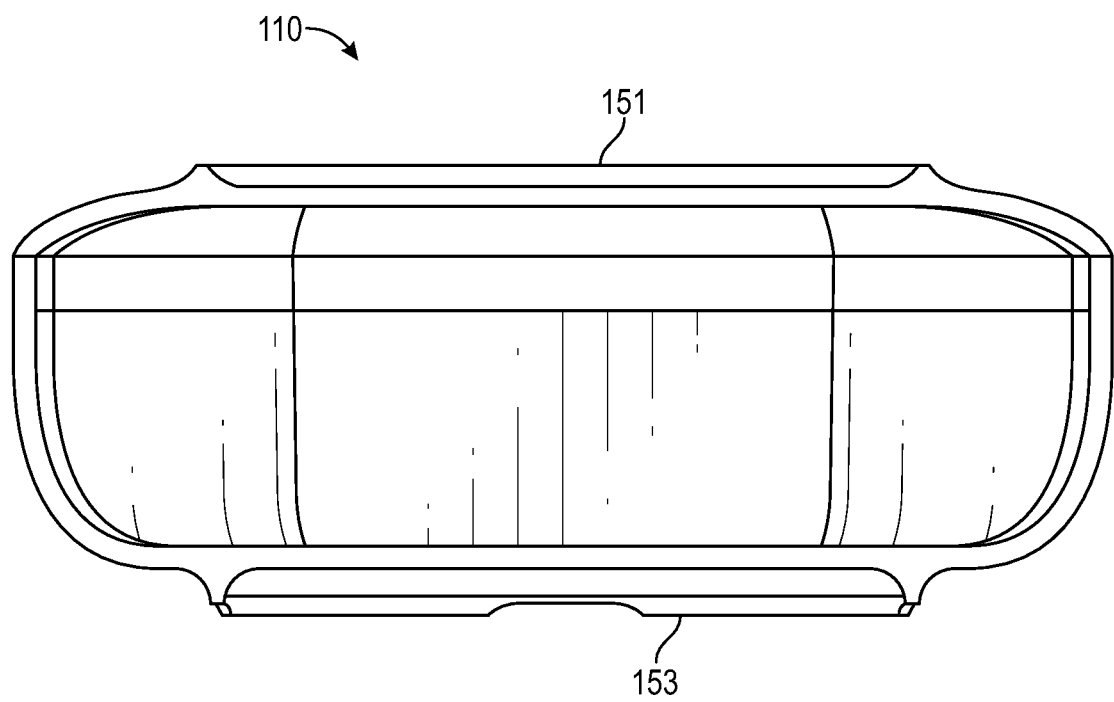
FIG. 7 is a cross-sectional view of the portion container of FIG. 6.

FIG. 6 is an exploded perspective view of a cubby 116 and portion container 110 of an autonomous food station according to an example embodiment of the present invention, after opening the cubby 116 from within the interior of the autonomous food station to remove a portion container carrier 174 and portion container 110. As shown in FIG. 6, the portion container 110 may include a label 124, for example which includes scannable information specific to that portion container 110, the meal inside, and/or the associated customer. FIG. 7 is a cross-sectional view of the portion container 110 of FIG. 6. When separated, the lid 151 of the portion container 110 may be stackable with lids of other like portion containers, and the base 153 of the portion container 110 may be stackable with the bases of other like portion containers for compact nested storage or transport.

Figure 8:
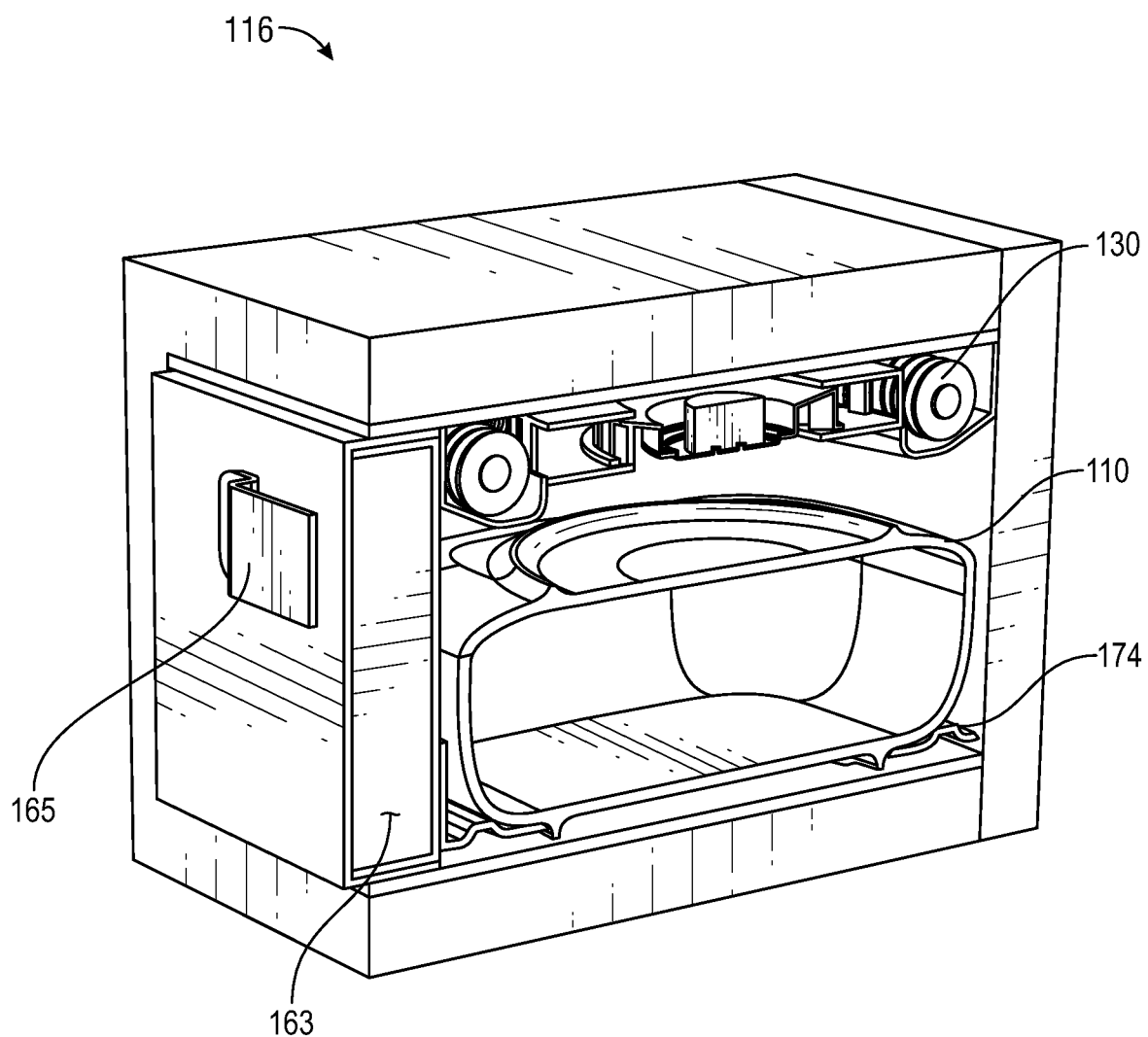
FIG. 8 is a perspective cross-sectional view of the cubby of FIG. 6, in a closed state with the portion container inside.
Figure 9:
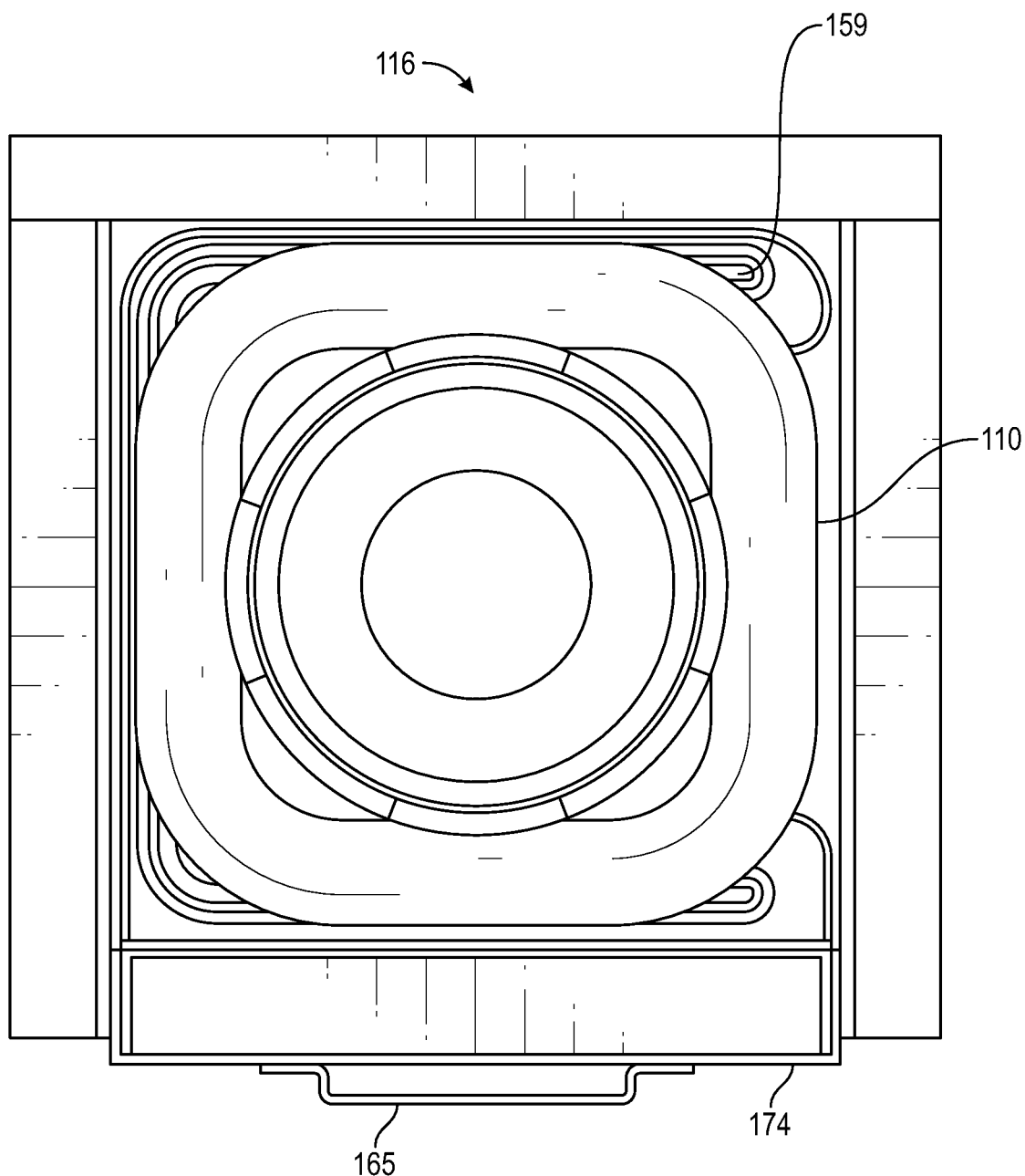
FIG. 9 is a top view of the interior of the cubby of FIG. 6, in a closed state with the portion container inside.
Figure 10:
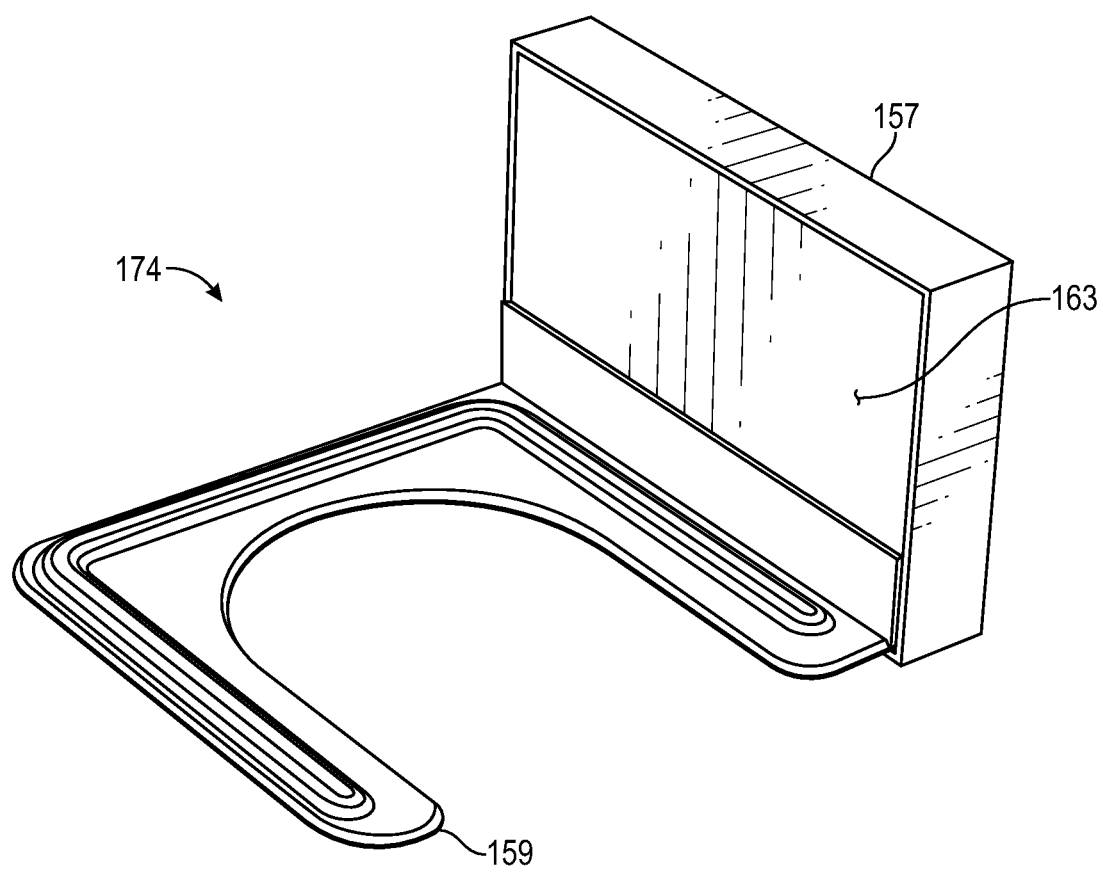
FIG. 10 is a perspective view of the portion container carrier of the cubby of FIG. 6.

FIG. 8 is a perspective cross-sectional view of the cubby 116 of FIG. 6, in a closed state with the portion container 110 inside. FIG. 9 is a top view of the interior of the cubby 116 of FIG. 6, in a closed state with the portion container 110 inside. FIG. 10 is a perspective view of the portion container carrier 110 of the cubby 116 of FIG. 6. In certain embodiments, the portion container 110 may have a rounded shape which, being similar to most dishware, may be familiar to customers as a food serving container. In certain embodiments, air circulation may be improved for heating and cooling the portion container 110 within the cubby 116 because cubby 116 has a cuboid inner chamber, while the portion container 110 has a rounded shape that leaves peripheral space for the air flow.

The cubby 116 is preferably thermally insulated to save energy and facilitate establishment and maintenance of a temperature difference between the cubby's interior and its exterior environment within the autonomous food station 102, as directed by the food station control logic 115. As shown in FIG. 8, the cubby 116 may include enough internal space for the portion container 110, a heat transfer assembly 130, and insulation on all sides. In certain embodiments, the back 155 of the cubby 116 may be formed by a portion or region of one of the insulated left and right cubby access panels 196L and 196R. In the embodiment of FIG. 10. the portion container carrier 174 includes two basic elements: a portion container support plate 159, and a carrier plate 163. The carrier plate 163 includes a front panel 157 (of the cubby 116) to which the portion container support plate 159 may be permanently fixed. The front panel 157 of the cubby 116 may include insulation of adequate thickness to improve the efficiency of heating or cooling inside the inside of the cubby 116 (e.g. approximately 1" thickness in certain embodiments). Cubbies that are intended to together heat or cool food portion containers as a group may forego insulation on separating walls between them. The portion container support plate 159 is preferably designed to support the portion container 110 within the cubby 116, and thereby may improve heated or cooled air circulation around the portion container 110. For example, the portion container support plate 159 may comprise a horseshoe-shaped horizontal metal plate that fits around a circular rim that protrudes downwardly from the base 153 of the portion container 110.

The carrier plate 163 of the portion container carrier 174 may include a handle 165 that can be grasped by an end-effector 172 of the internal transport system 164 of FIG. 5. In the embodiment of FIG. 10 the portion container carrier 174 serves to carry the portion container 110, for example as it is transported by the internal transport system 164 of FIG. 5 (e.g. from the cubby 116 to the collection hatch 113 to be collected by the customer 108, or to the identification site 122 for scanning of the label 124 of the portion container 110). The portion container support plate 159 preferably can slide out from around a lower rim that protrudes downwardly from the base 153 of the portion container 110, so that the portion container 110 may be remain in the collection hatch 113 while the portion container carrier 174 is being withdrawn by the internal transport system 164. In this way, the portion container carrier 174 may facilitate loading and removal of the portion containers from cubbies 116 and the collection hatch 113.

Figure 11:
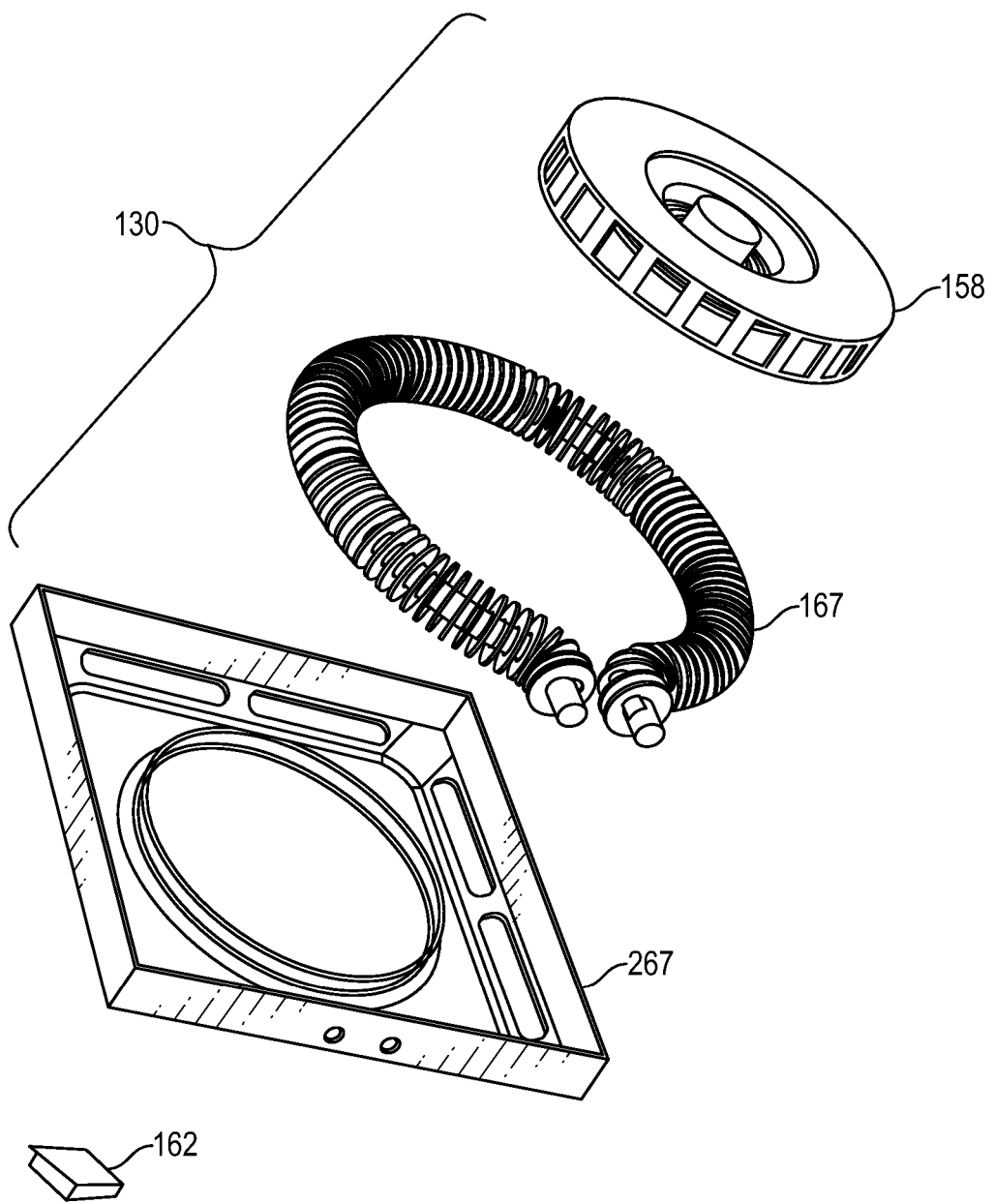
FIG. 11 is an exploded view of an example heat transfer assembly for a cubby of an autonomous food station according to an example embodiment of the present invention.
Figure 12:
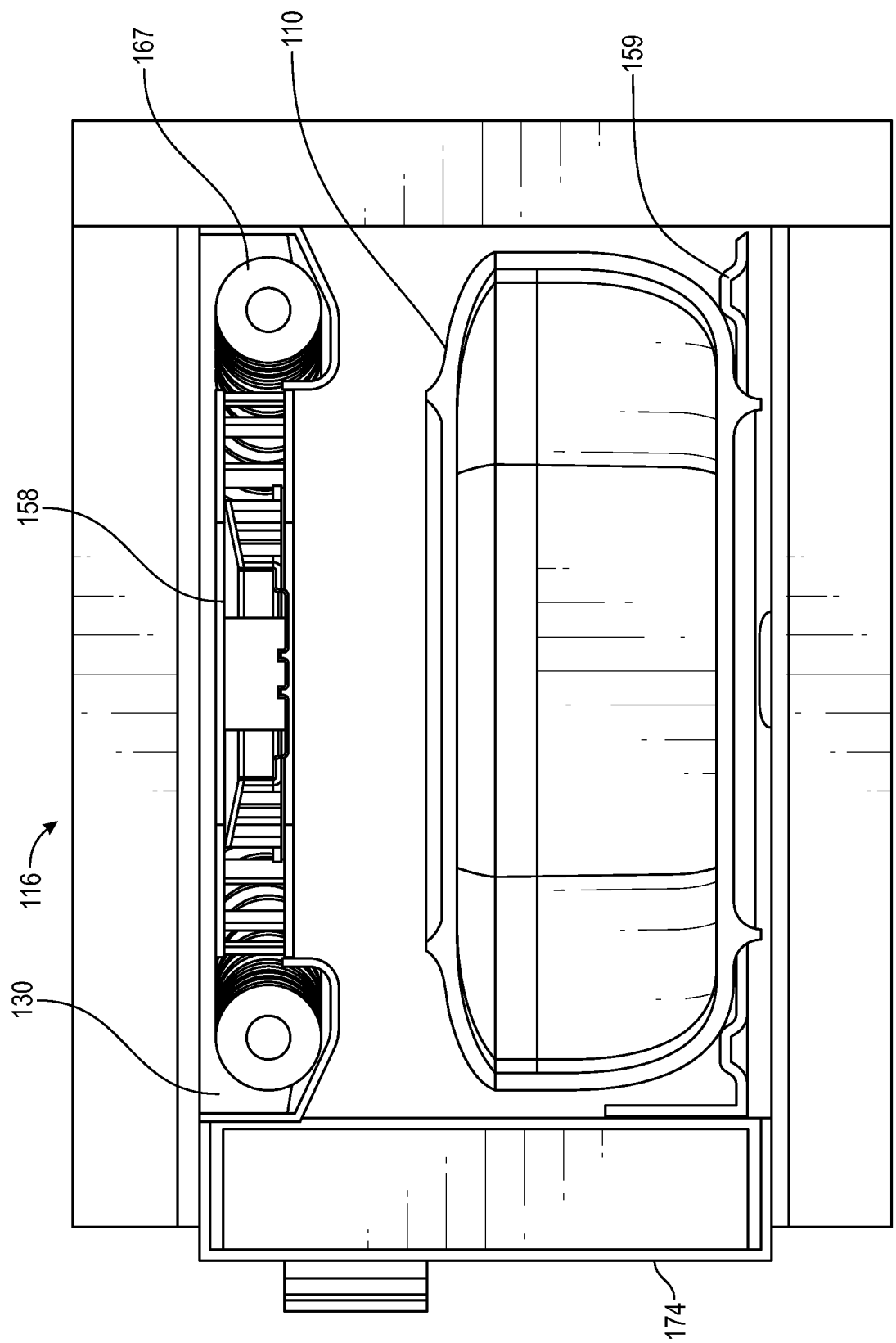
FIG. 12 is a cross-sectional view of a cubby including a portion container of an autonomous food station according to an example embodiment of the present invention that utilizes the heat transfer assembly of FIG. 11.
Figure 13:
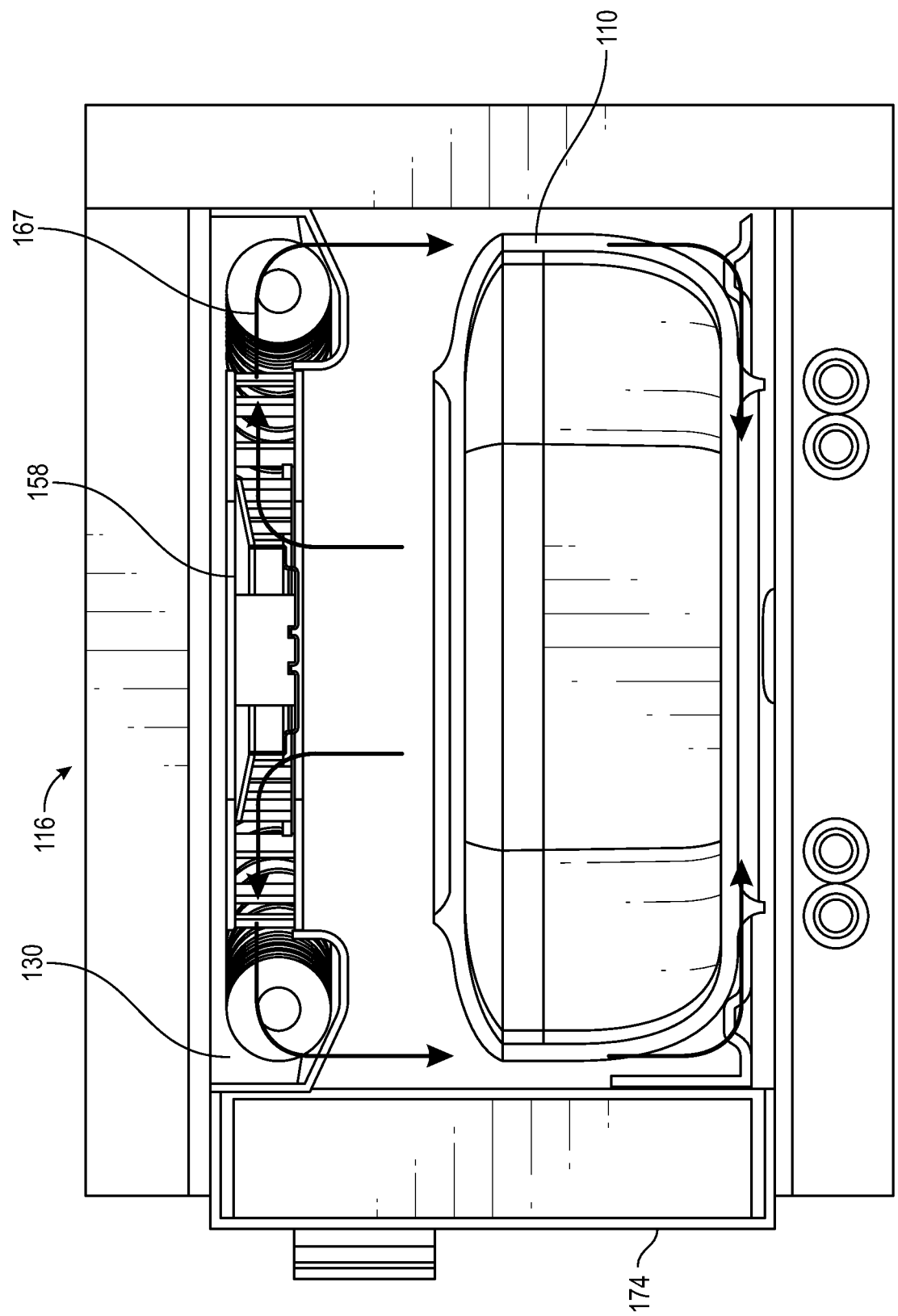
FIG. 13 depicts an example of forced convection by a blower fan of the heat transfer assembly of the cubby of FIG. 12.

FIG. 11 is an exploded view of an example heat transfer assembly 130 for use in a cubby 116 of an autonomous food station according to an example embodiment of the present invention. In the embodiment of FIG. 11, the heat transfer assembly 130 optionally includes a housing 267, a blower fan 158, a heating and cooling element 167, and a temperature sensor 162 (e.g. a negative temperature coefficient thermistor). FIG. 12 is a cross-sectional view of a cubby 116 including a portion container 110 of an autonomous food station according to an example embodiment of the present invention, which utilizes the heat transfer assembly 130 of FIG. 11. FIG. 13 depicts an example of forced convection by a blower fan 158 of the heat transfer assembly 130 of the cubby 116 of FIG. 12, with arrows depicting a simplified representation of a resulting air flow.

Figure 14:
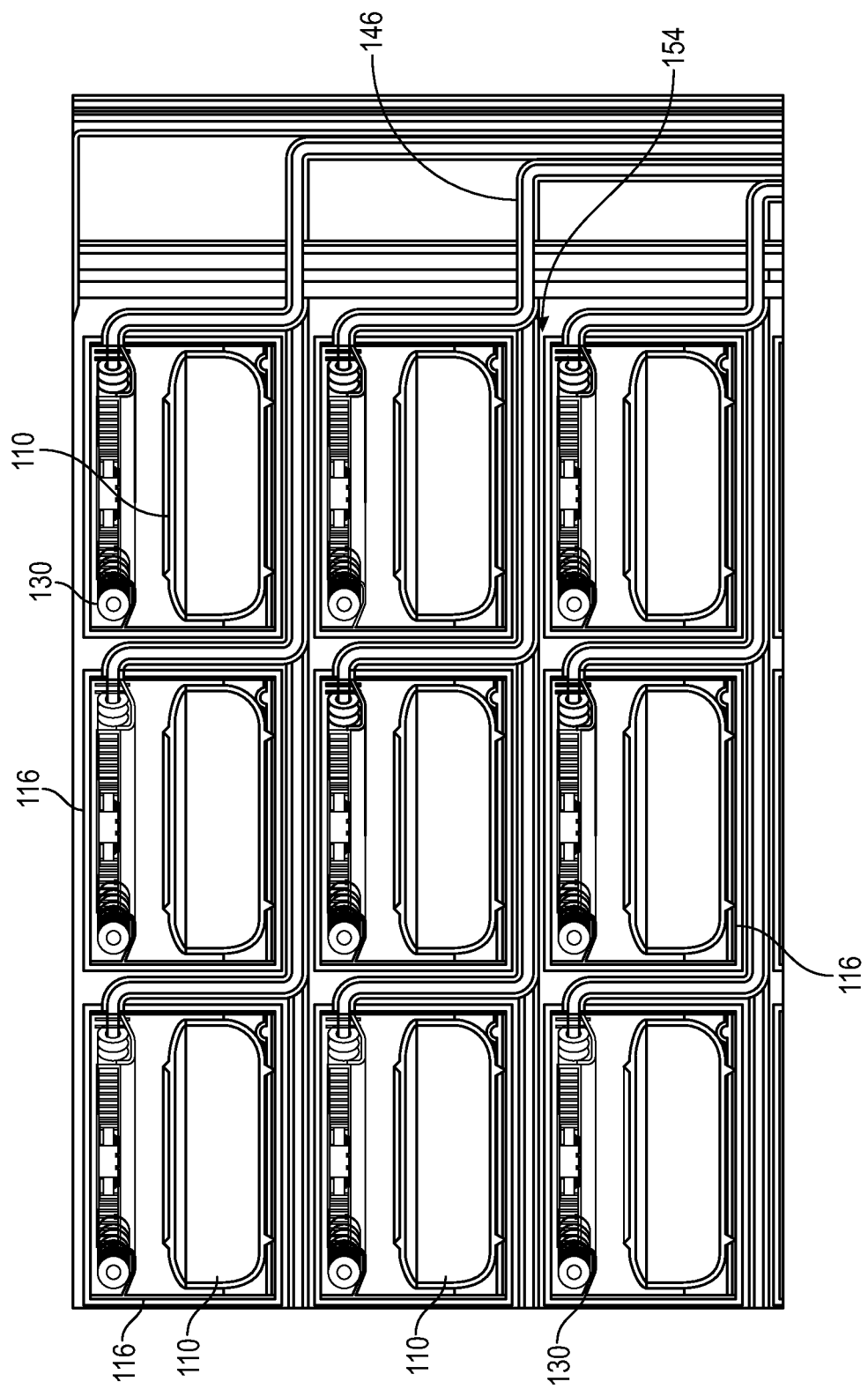
FIG. 14 is a cross-sectional view of a plurality of cubbies of an autonomous food station according to an example embodiment of the present invention, showing an example of how cooling and heating fluids may be circulated to the cubbies.
Figure 15:
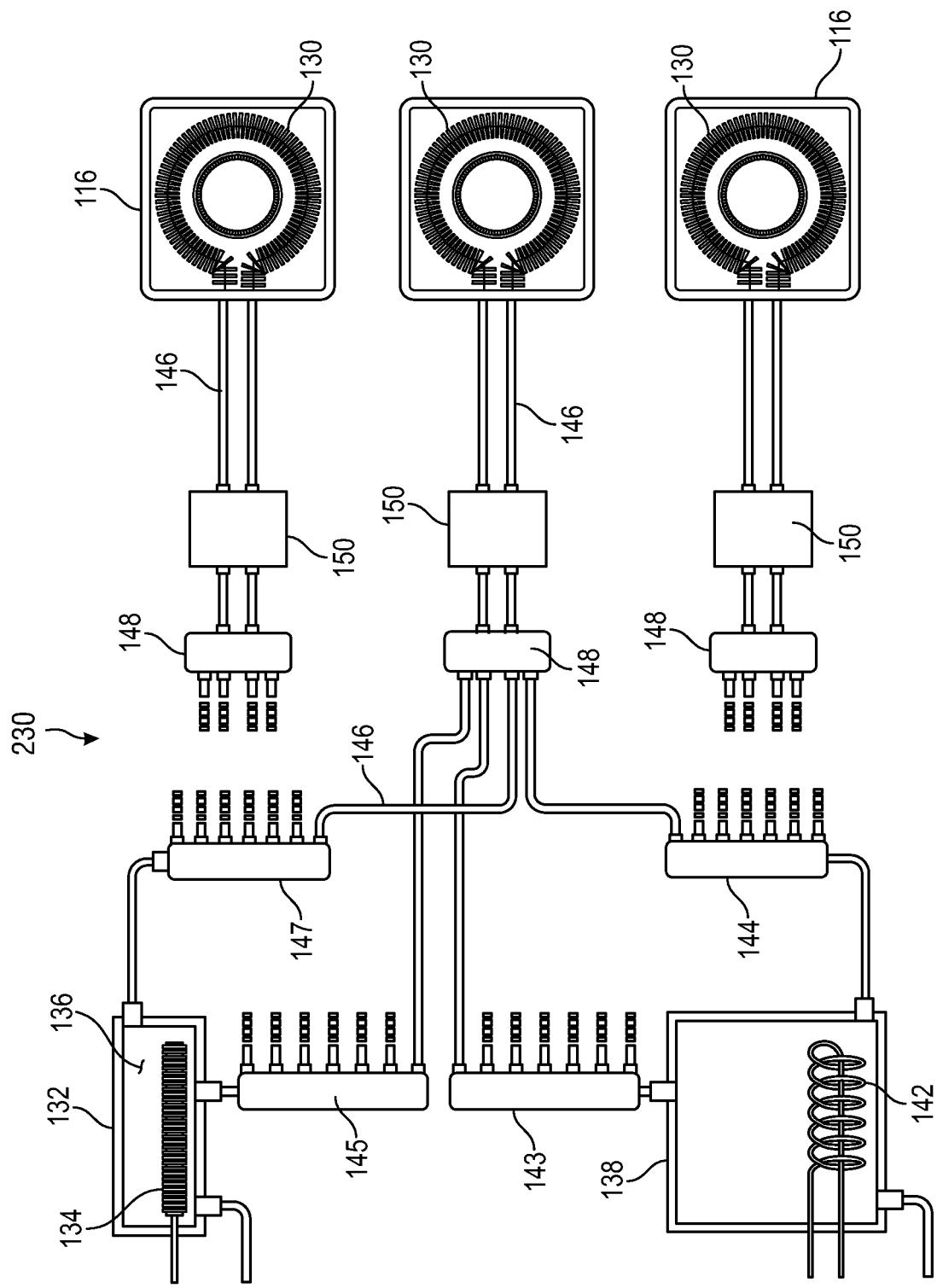
FIG. 15 is a schematic diagram of a system for cooling and heating fluids for independently heating or cooling food portion containers in individual cubbies of an autonomous food station, according to an example embodiment of the present invention.
Figure 16:
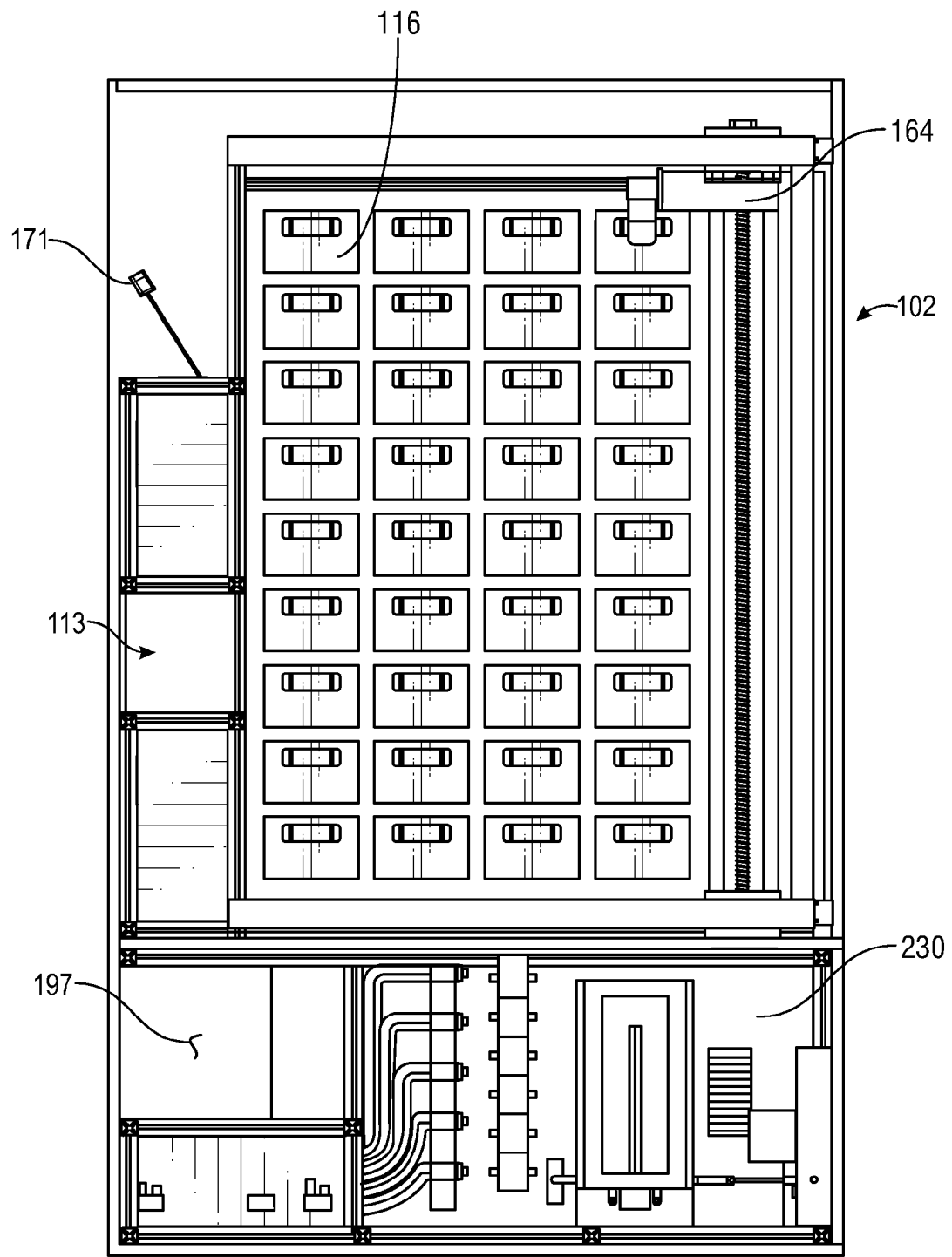
FIG. 16 is a side view of the interior of an autonomous food station that includes in a base compartment portions of the example cooling and heating system of FIG. 15.
Figure 17:
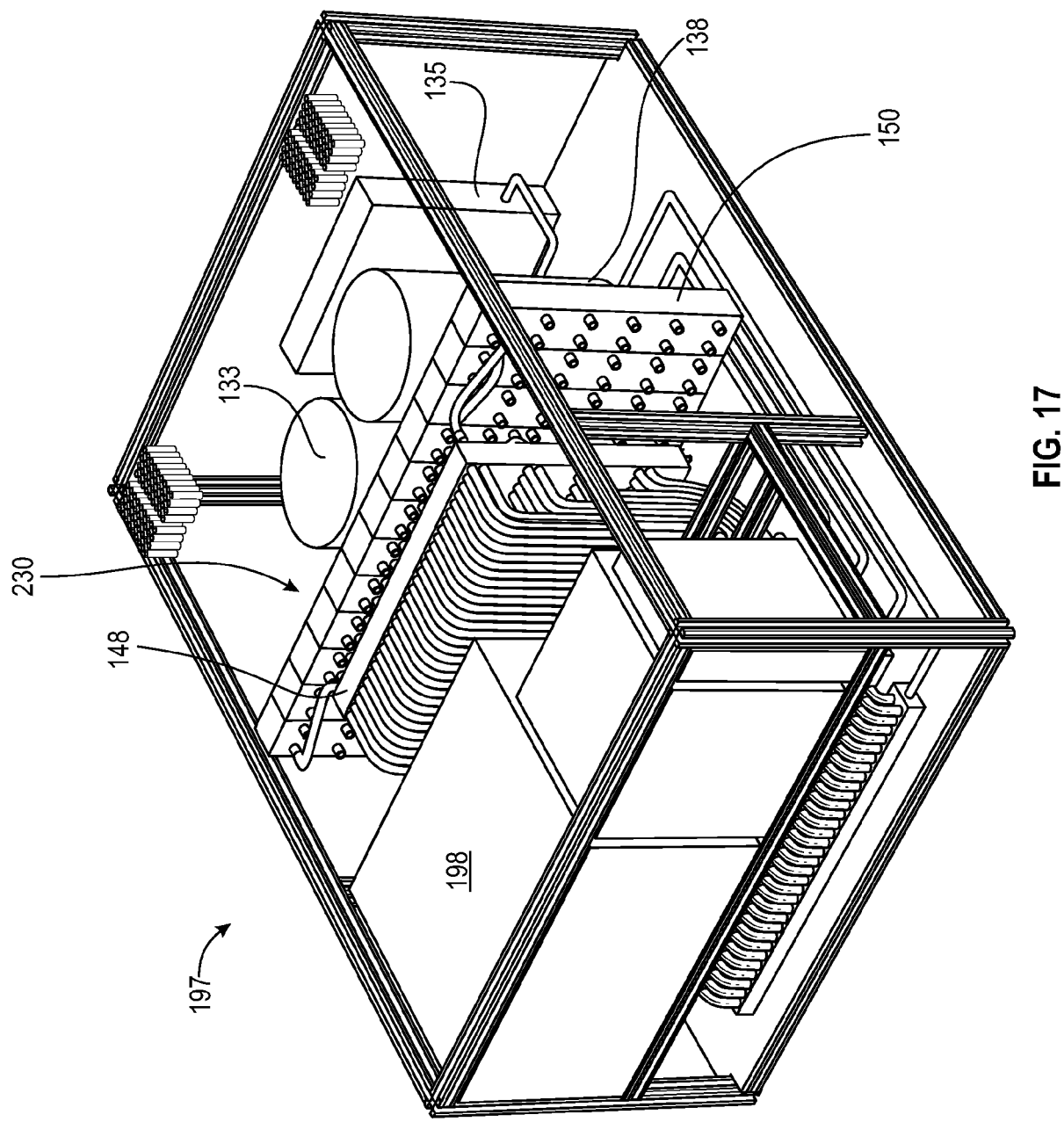
FIG. 17 is a perspective view of the base compartment that supports the example autonomous food station of FIG. 16.
Figure 18:
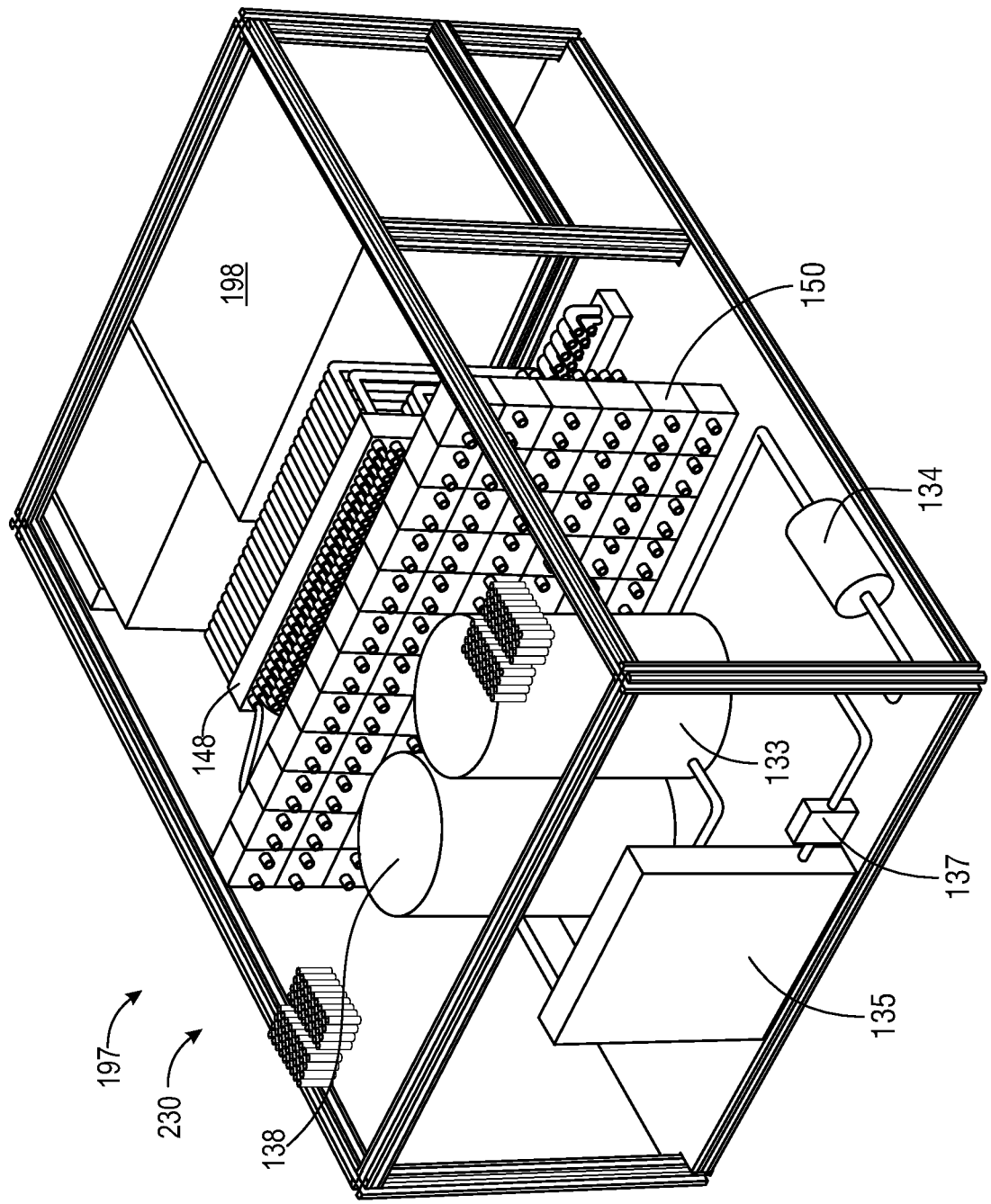
FIG. 18 depicts the base compartment of FIG. 17 viewed from an opposing direction.

FIG. 14 is a cross-sectional view of a plurality of cubbies 116 of an autonomous food station according to an example embodiment of the present invention, showing an example of how cooling and heating fluids may be circulated to the cubbies 116. FIG. 15 is a schematic diagram of a hydronic heating and cooling system 230 for heating, cooling, and circulating thermal fluid(s) for individually and independently heating and cooling food portion containers in the cubbies 116 of an autonomous food station according to an example embodiment of the present invention. FIG. 16 is a side view of the interior of an autonomous food station 102 that includes a base compartment 197 that houses portions of the example cooling and heating system of FIG. 15. The base compartment 197 may also include a housing 198 for the system computer and control logic 115. FIG. 17 is a perspective view of the base compartment 197 that supports the example autonomous food station 102 of FIG. 16. FIG. 18 depicts the base compartment 197 of FIG. 17 viewed from an opposing direction.

In the embodiment of FIGS. 14-16, each portion container 110 stored within a corresponding insulated cubby 116 may be individually cooled and heated independently of the other portion containers 110 inside the other cubbies 116. In certain embodiments, the independent heating and cooling may be done by a hydronic system as shown, but in other embodiments another conventional heating or cooling technology may be used, such as a separately switched electrical heating element in each insulated cubby 116, or by provision of a microwave magnetron for directing microwave radiation to controllably heat an enclosed food portion container in one or more shielded cubbies, etc.

In certain embodiments, one or more fluids may be heated, cooled, and distributed for circulation through the heat transfer assemblies 130 of the cubbies 116 by a hydronic system like the example heating and cooling system 230 shown in the schematic representation of FIG. 15. The hydronic heating and cooling system 230 may include a conventional refrigeration subsystem 132 (e.g. in certain embodiments a conventional 4000 BTU refrigeration subsystem may be sufficient), for example, having a compressor 133, a shell and tube evaporator 134, a condenser 135, and a high-to-low pressure valve 137, for cooling a thermal fluid 136 (e.g. a liquid used for heat transfer, such as water or a solution or fluid having a lower freezing temperature than does water).

The hydronic heating and cooling system 230 may also include a conventional boiler 138 with a submersed electric heating element 142. In this context the term "boiler" does not imply that the thermal fluid is necessarily brought to its boiling point, and in certain preferred embodiments it is not boiled but rather heated to a temperature below its boiling point. Rather, the term "boiler" is used here only to refer to a conventional apparatus for heating a liquid. Hence the heating and cooling system 230 may be a combination of two systems, a heating system that selectively provides heat to food portion containers in each of the cubbies 116 independently of the other cubbies 116 (e.g., with a heating rate and for a heating duration that is independently controlled by the food station control logic 115), and a cooling system that selectively removes heat from food portion containers in each of the cubbies 116 independently of the other cubbies 116 (e.g., with a cooling rate and for a cooling duration that is independently controlled by the food station control logic 115).

In the embodiment of FIG. 15, the hydronic heating and cooling system 230 may include a hot return header or manifold 143, a hot supply manifold 144, a cold supply manifold 145, and a cold return manifold 147. These manifolds or headers may be connected to a series of circulation tubes 146, valves 148 (e.g. four-way port pinch valves that may be actuated by solenoids controlled by the food station control logic 115), and conventional electrical pumps 150 for driving the thermal fluids through the heat transfer assemblies 130 of the cubbies 116. The food station control logic 115 preferably controls the operation of the pumps 150 and the valves 148. The valves and pumps may direct certain cubbies to commence or discontinue heating and others to commence or discontinue cooling at different times, and some cubbies may be capable of only heating or cooling by omitting one or more of the circulation tubes 146 to such cubbies to simplify the system and reduce its total cost and complexity. While FIG. 15 shows a plurality of individually controllable pumps 150, such pumps optionally may be replaced by a single pump and one or more additional valves, functioning to supply heated or chilled thermal fluid independently to the heat transfer assemblies 130 under direction of the food station logic 115.

The circulation tubes 146 may be flexible insulated tubes, and may be channeled through a gap 154 between the cubbies 116. For example, in one example embodiment, the circulation tubes 146 optionally may be 12 mm diameter flexible tubes that are routed through 25 mm gaps 154. In certain embodiments, conventional insulated electric wires may be routed along with the circulation tubes 146 and be used to supply electrical power to the cubby blower fans 158 and the temperature sensors 162 of the heat transfer assemblies 130. In certain embodiments, the assembly of the autonomous food station 102 may include routing the circulation tubes 146 and electric wires into the gaps between the cubbies 116, connecting their ends as needed, and then filling the gaps with expandable polyurethane insulation after the tubes circulation 146 and electric wires have been tested and found to operate satisfactorily.

Figure 19:
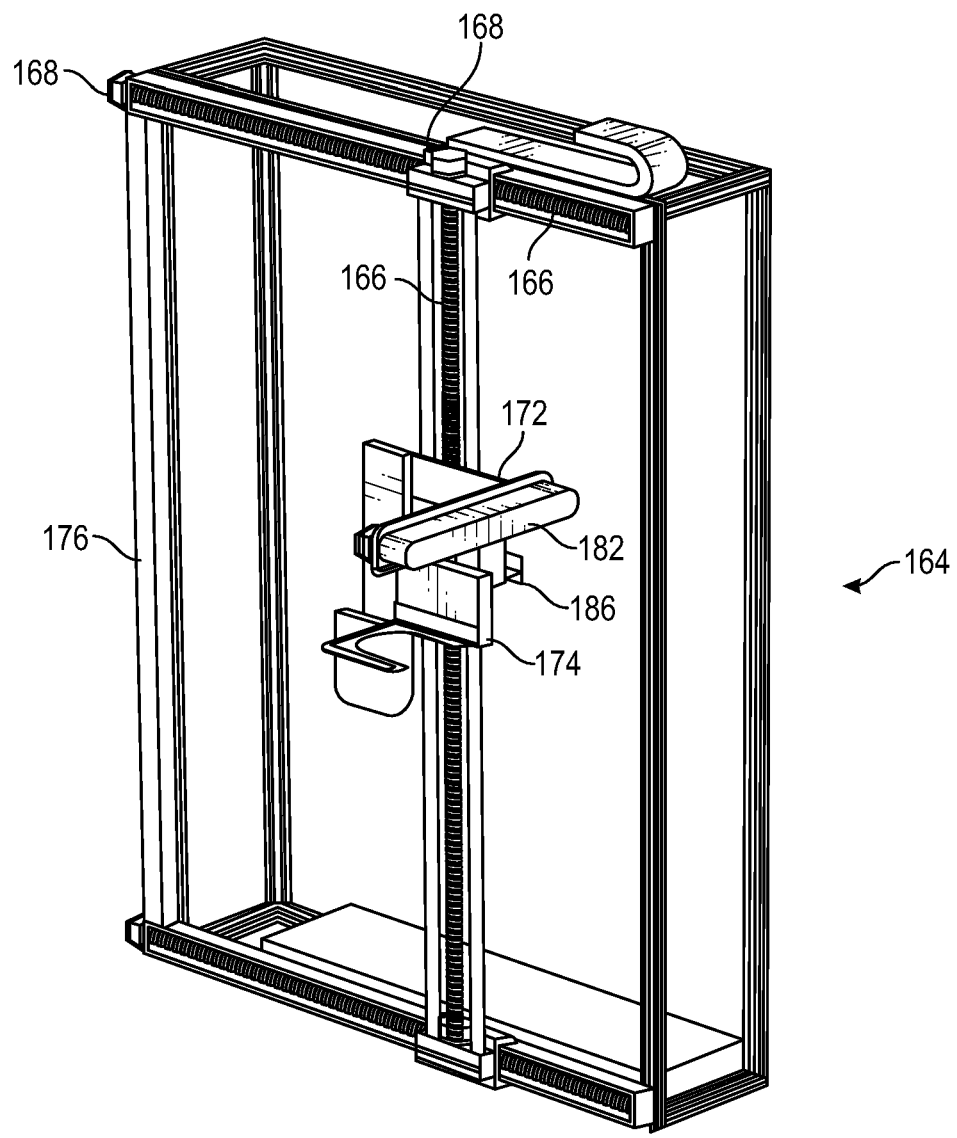
FIG. 19 is a perspective view of the internal transport system of the autonomous food station of FIG. 5.
Figure 20A:
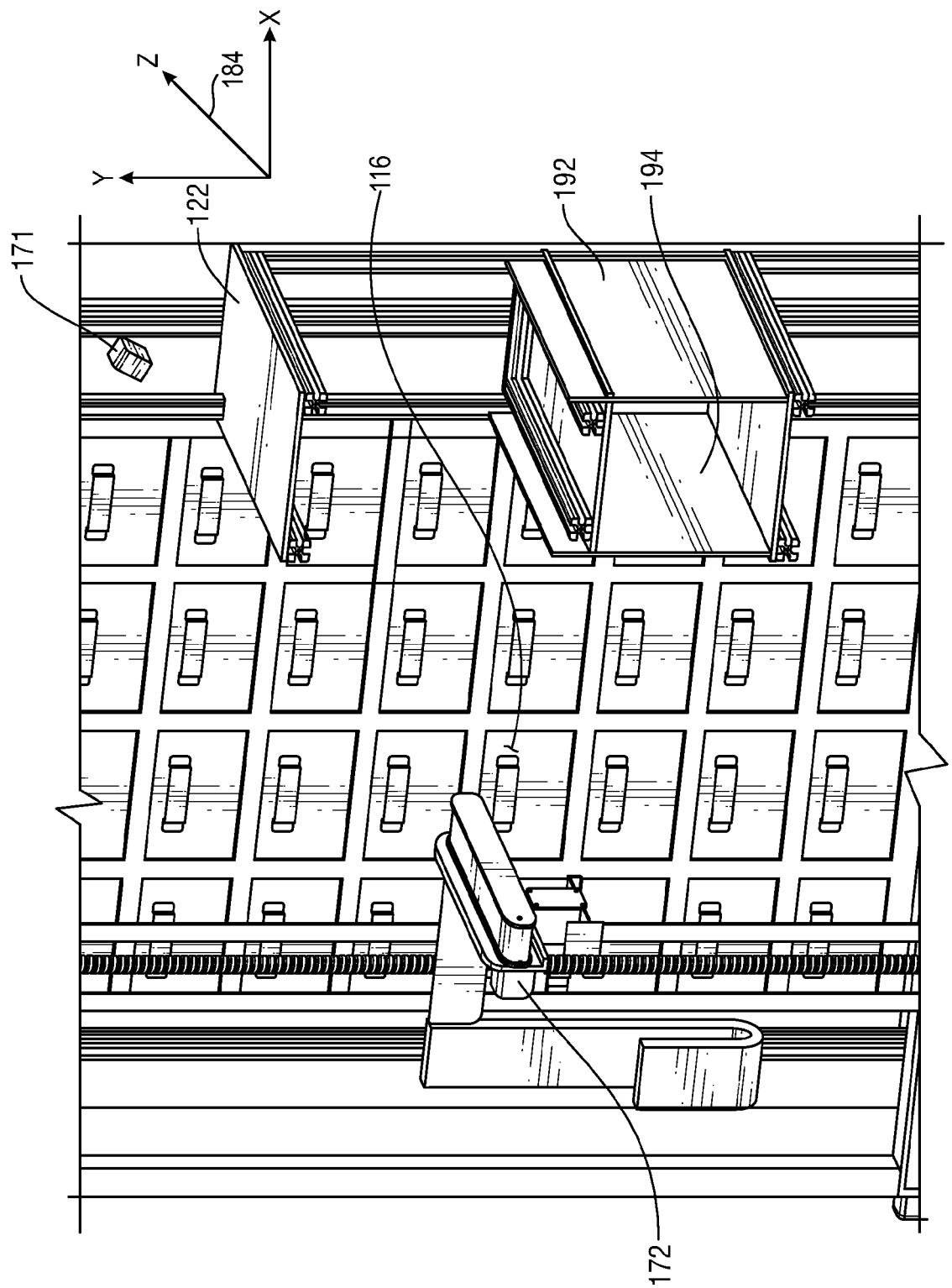
FIGS. 20A through 20E is a series of perspective views showing examples of movement of a portion container by the internal transport system of FIG. 5, within an autonomous food station according to an example embodiment of the present invention.
Figure 20B:
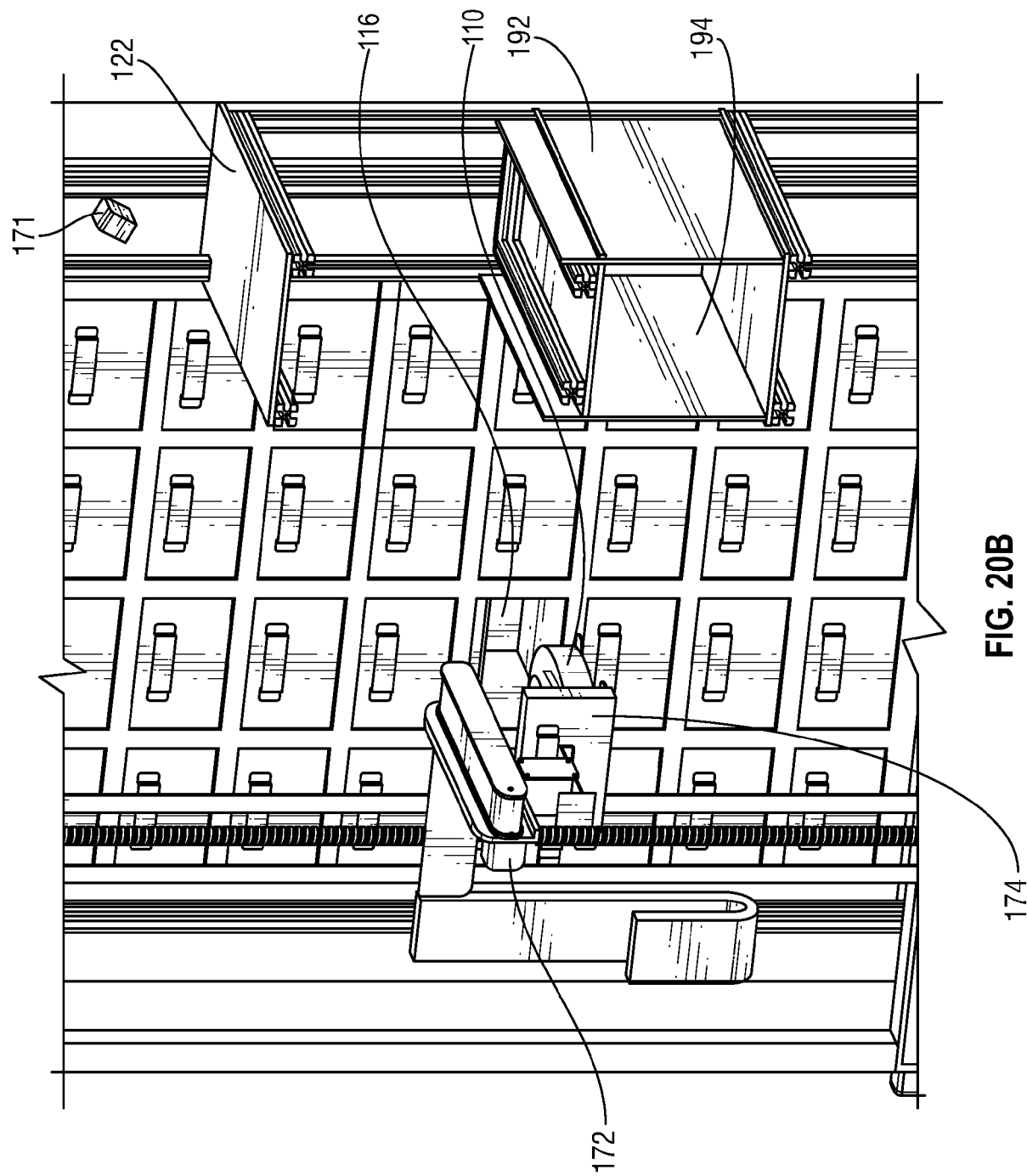
Figure 20C:
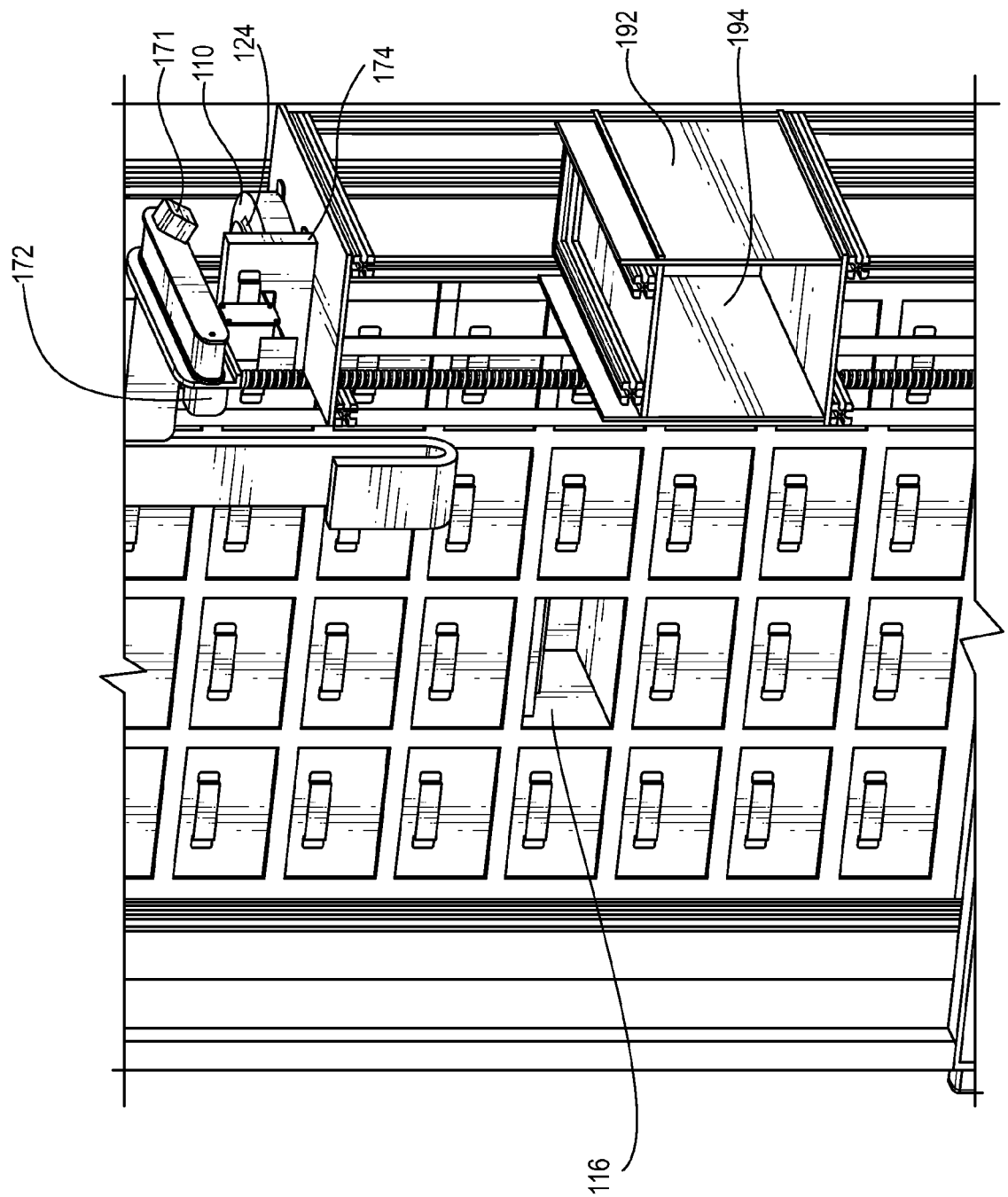
Figure 20D:
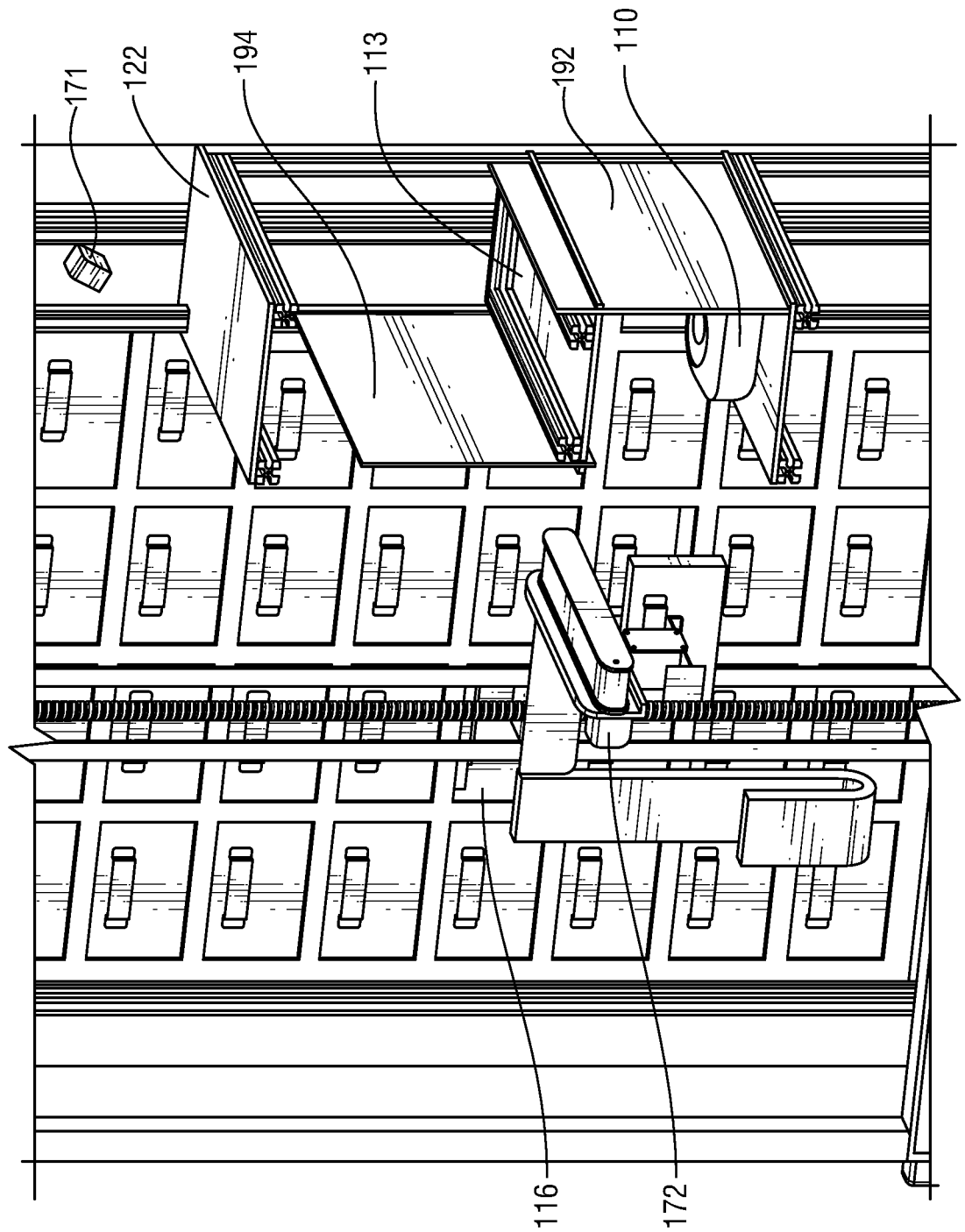
Figure 20E:
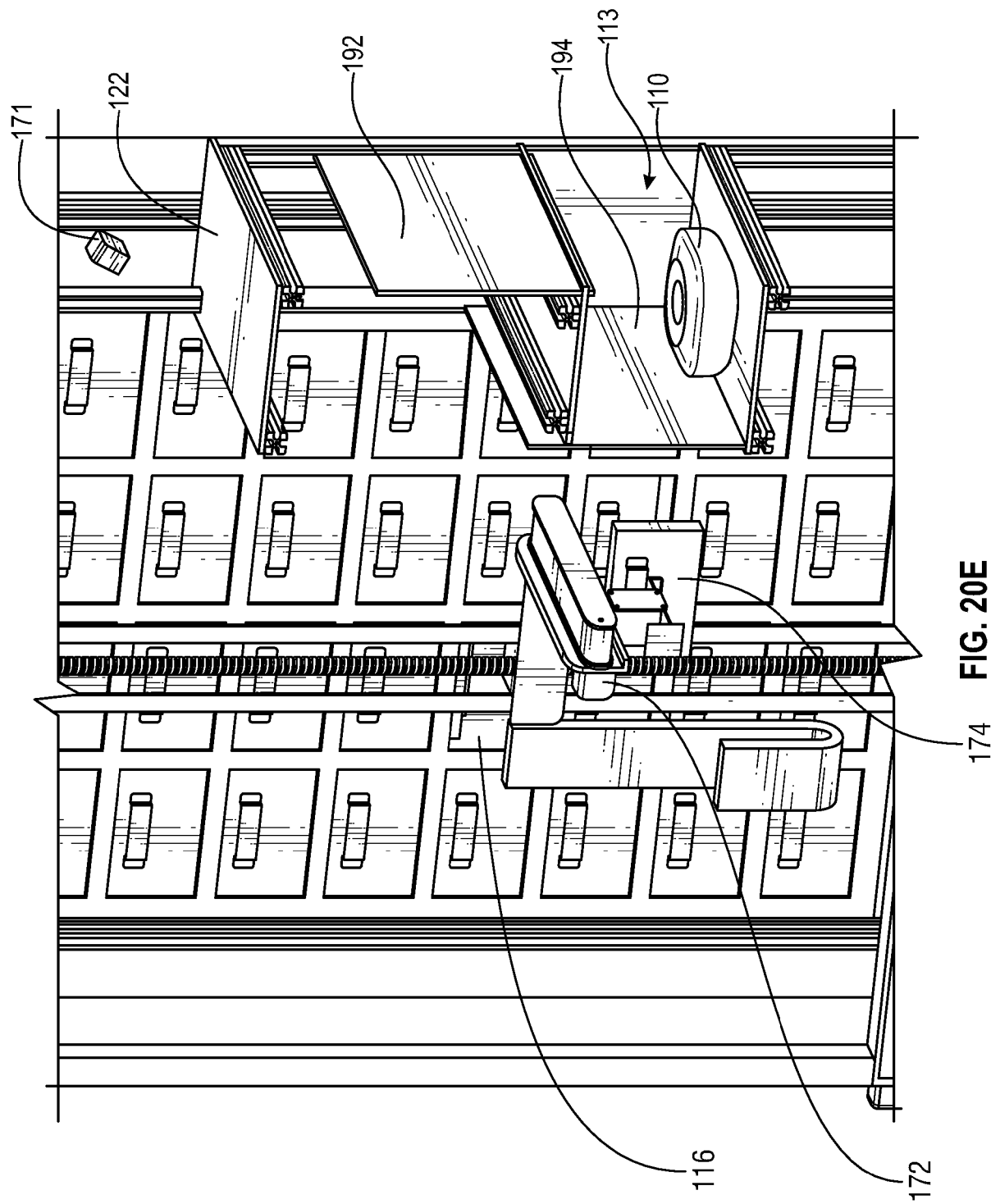

FIG. 19 is a perspective view of the internal transport system 164 of the autonomous food station 102 of FIG. 5. FIG. 20A through FIG. 20E is a series of perspective views showing examples of movement of a portion container 110 by the internal transport system 164. In the embodiment of FIGS. 19 and 20A, the internal transport system 164 can translate the end effector 172 in three orthogonal directions, e.g. along an X axis, Y axis, and Z axis 184 of a Cartesian coordinate system, to transport the portion containers 110 within the autonomous food station 102 under the control of the food station control logic 115. For example, the X axis may be horizontal and run side-to-side relative to the autonomous food station 102, the Y axis may be vertical, and the Z axis 184 may be horizontal and run front-to-back relative to the autonomous food station 102. The internal transport system 164 may include a support-frame 176 and conventional power and control cables. The internal transport system 164 may comprise conventional servo-controlled hydraulic or electromechanical actuators, such as orthogonal drive spindles 166 (e.g. lead screws) and drive motors 168 (e.g. stepper motors indexed by the control system of the food station control logic 115) as shown in FIG. 19, or may comprise another conventional mechanism for driving motion in the X-Y plane.

The internal transport system 164 preferably also includes an end effector 172 that may be adapted to temporarily couple to the handle 165 of the portion container carrier 174 of each cubby 116 (e.g. by latching on to the handle 165), to enable the internal transport system 164 to retract and transport portion container carriers 174 along with the portion container 110 that each supports. In certain embodiments the internal transport system may comprise a conventional robotic arm with the end effector 172 attached to a distal end of the robotic arm.

The end effector 172 may be mounted on a motor-driven belt 182 (e.g. driven by a stepper motor under the control of the food station control logic 115) for movement along the Z axis 184, or alternatively may be driven along the Z axis 184 by another conventional servo-controlled hydraulic or electromechanical actuator, for example in the same manner as for the X axis or Y axis (e.g. by use of a Z-oriented lead screw that is turned by a controlled stepper motor). The end effector 172 may include a plurality of brackets 186 (e.g., two L-shaped or T-shaped brackets), for example, one on the left and one on the right, for selectively coupling with (e.g. grabbing) the portion container carriers 174 on the left and right sides of the handle 165, respectively. Alternately the end effector 172 may include a single bracket that may swivel to the left or the right for coupling with the handle 165 of the portion container carrier 174.

In certain embodiments, one of the roles of the internal transport system 164 may be to move portion containers 110 to and from an identification site 122 so that the content and location of each can become known to the food station control logic 115. This role is depicted by the series of perspective views shown in FIGS. 20A, 20B, and 20C. For example, after the portion containers 110 are loaded into the cubbies 116 (e.g. randomly by the delivery partner 112), the food station control logic 115 may command the internal transport system 164 to initiate identification of each portion container 110 by moving each portion container 110 to the identification site 122 for scanning of its label 124, and then returning it to its corresponding cubby 116. In certain embodiments, each cubby 116 may optionally include a conventional sensor (e.g. capacitive or magnetic sensor or pressure-sensitive switch) to signal to the food station control logic 115 whether the cubby 116 is empty or contains a portion container 110, so that the food station control logic 115 can efficiently avoid commanding the internal transport system 164 to transport portion container carriers 174 that do not support any portion container 110.

For cubbies 116 that include a portion container 110, the internal transport system 164 may methodically pick up one portion container 110 after another, and transport each to the identification site 122 so that its label 124 may be read by a scanner 171 (e.g. a camera, or QR code or barcode reader). The portion container's label information may then be associated with its location (i.e. corresponding cubby 116) by the food station control logic 115. The internal transport system 164 may then return the portion container 110 to its cubby 116 before repeating the process with the next portion container 110.

In certain alternative embodiments, the autonomous food station 102 may not need to use the internal transport system 164 for identification of the portion containers 110, or for associating each with its corresponding cubby 116 in which it is located. For example, use of the internal transport system 164 may not be necessary for identification and location of the portion containers 110 in embodiments in which the user interface of the autonomous food station 102 permits the delivery partner 112 to enter a portion container identification number for each cubby 116 that is loaded. Also, for example, use of the internal transport system 164 may not be necessary for identification and location of the portion containers 110 in alternative embodiments that include a label scanner in each cubby 116.

Another role of the internal transport system 164 may be to move portion containers 110 between cooled and heated cubbies at specified times, or to the collection hatch 113 for collection by the customer 108 at a specified time. This latter role is depicted by the series of perspective views shown in FIGS. 20A, 20B, 20D, and 20E. For example, when a customer 108 identifies herself to the user interface of the autonomous food station 102 for food collection, the food station control logic 115 may then command the internal transport system 164 to retrieve the corresponding portion container 110 and transport it to the collection hatch 113.

The collection hatch 113 may include two shutters, a front external shutter 192 facing the customer and a rear internal shutter 194 at the back of the collection hatch 113 facing the interior space of the autonomous food station 102 and its internal transport system 164. The food station control logic 115 may be programmed to open and close these shutters during the internal transport of the portion container 110 into the collection hatch 113. For example the external shutter 192 may be servo controlled by an actuator such as a solenoid, so that the external accessibility of the collection hatch 113 is selective and controllable by the control system of the food station control logic 115. The internal shutter 194 may also be servo controlled by a conventional actuator such as a solenoid so that access from the collection hatch 113 to an interior of the autonomous food station 102 may be selectively denied while the external shutter 192 is open.

After the portion container carrier 174 is retracted from under the portion container 110 within the collection hatch 113, the internal transport system 164 preferably returns the portion container carrier 174 to its cubby 116, and then waits for the next command from the food station control logic 115.

Another optional role of the internal transport system 164 may be, in certain embodiments, to transport used portion containers 110 that are returned to the collection hatch 113 by customers 108 to an internal storage area of the autonomous food station 102. For example, when a customer 108 comes back after eating, or when a customer 108 comes to collect their next meal, certain embodiments may allow the customer 108 to insert a used and possibly empty or mostly-empty portion container back to the collection hatch 113. In certain preferred embodiments that may not be allowed, but rather an external storage for returned portion containers 110 may be utilized instead, for example, to avoid the risk that the autonomous food station 102 (e.g. the collection hatch 113) could become contaminated by handling used portion containers 110. Such risk may depend, in part, on the type of foods being sold.

In embodiments allowing internal return of used portion containers 110, the food station control logic 115 may respond to a "return container" prompt (e.g., from the customer 108 at the user interface of the autonomous food station 102) by causing the external shutter 192 of the collection hatch 113 to open to allow the customer 108 to place the used portion container 110 into the collection hatch 113. This may require no customer identity verification. The food station control logic 115 may then command the external shutter 192 to close and the internal shutter 194 to open so that the internal transport system 164 can move the used portion container 110 to an internal storage area directly, or first to the identification site 122 to identify the returned portion container 110 for credit to the customer 108. The food station control logic 115 may then prompt the customer 108 to give feedback about perceived meal quality, which may be used to adjust future menus 111 in general or future offerings to the particular prompted customer 108.

Another optional role of the internal transport system 164 may be, in certain embodiments, to transport a portion container 110 from a typical cubby 116 to another cubby that can perform special or additional functions relative to typical cubbies 116. For example, based on information read from the label 124 of the portion container 110, the food station control logic 115 may determine that the portion container 110 should be relocated to another cubby that has special or additional food preparation utilities. Examples of special or additional food preparation utilities may include shielding and a conventional microwave magnetron for rapid heating of a food portion container within a cubby, or a means for meeting a food moisture requirement such as conventional humidity control using a desiccant.

Figure 21:
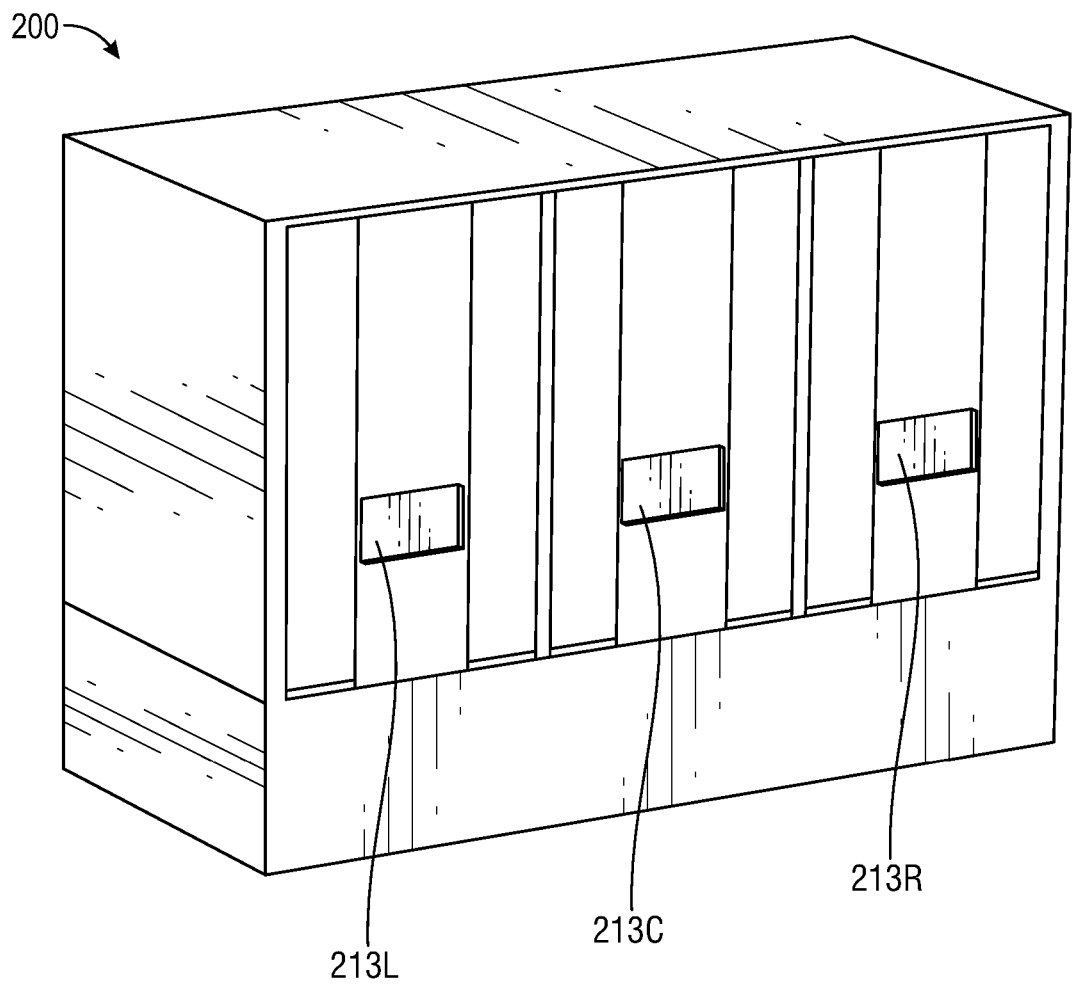
FIG. 21 is a front perspective view of a front-loading autonomous food station according to another embodiment of the present invention.
Figure 22:
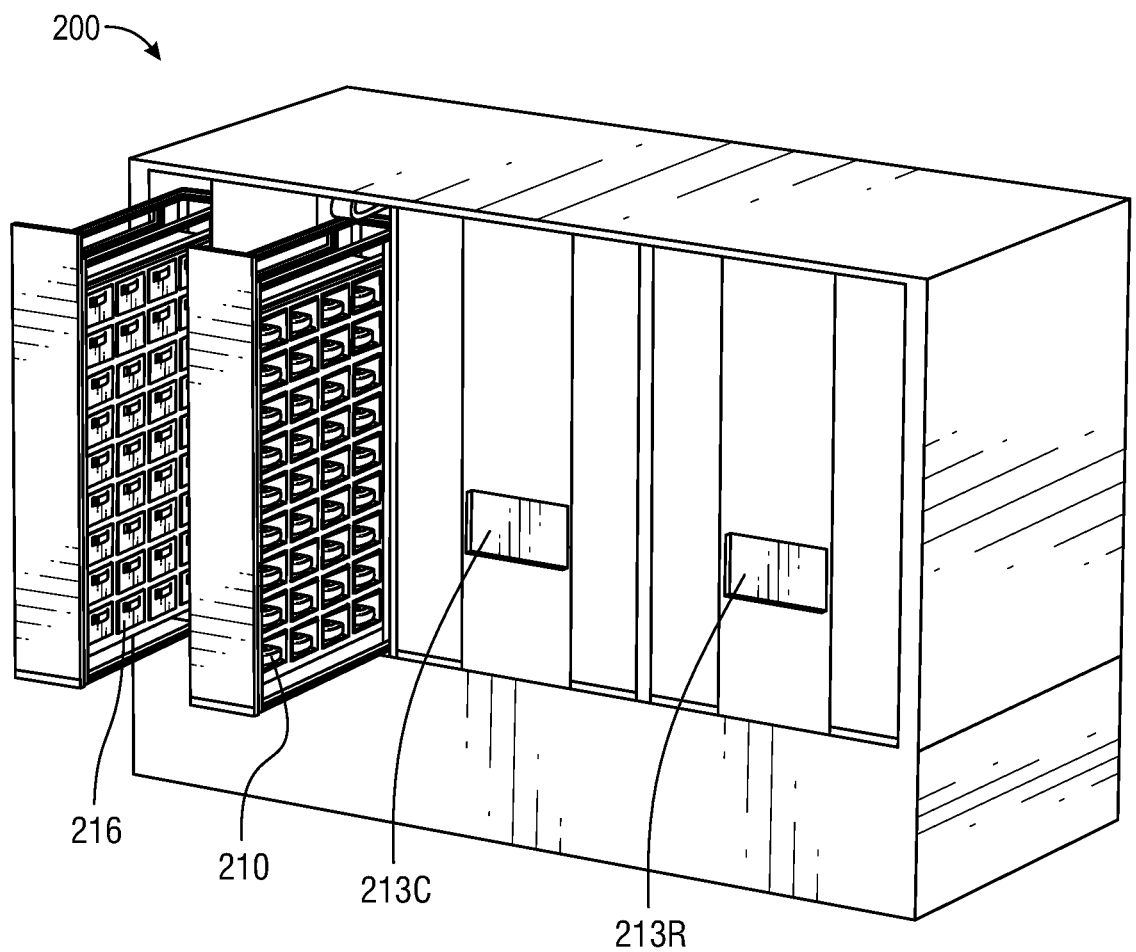
FIG. 22 is a perspective view of the front-loading autonomous food station of FIG. 21 with two left cubby storage drawers drawn open for external access.
Figure 23:
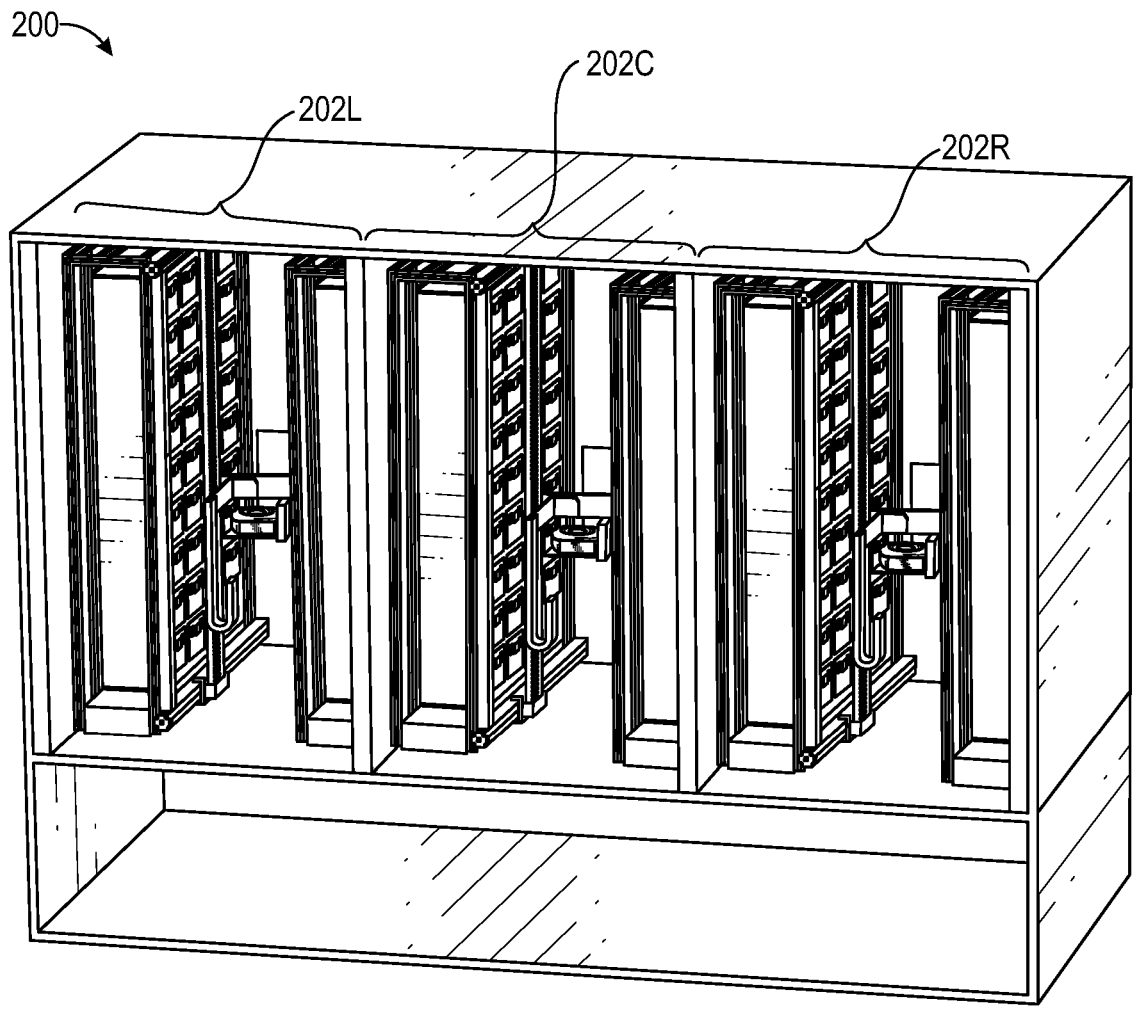
FIG. 23 depicts the interior of the front-loading autonomous food station of FIG. 21.

FIG. 21 is a front perspective view of a front-loading autonomous food station 200 according to another embodiment of the present invention. FIG. 22 is a perspective view of the front-loading autonomous food station 200 with two left cubby storage drawers drawn open for external access. FIG. 23 depicts the interior of the front-loading autonomous food station 200.

The front-loading autonomous food station 200 of the embodiment of FIGS. 21-23 optionally includes groups 202L, 202C and 202R of cubbies 216, each group accessed via its own internal transport system and collection hatch 213L, 213C, and 213R, respectively. Therefore, the front-loading autonomous food station 200 may have the capacity to serve a larger number of customers than the side-loading embodiment of FIGS. 2-4, which has only one internal transport system 164. Each group 202L, 202C and 202R of cubbies 216 may have its own food station control logic, or may share a common food station control logic. The food station control logic may direct the customer to collect food at a specific one of the collection hatches 213L, 213C, and 213R, according to which group 202L, 202C and 202R of cubbies 216 includes the customer's portion container 210. The delivery partner may service or load the entire station from the front of the autonomous food station 200, which may enable the autonomous food station 200 to be used in locations where the other sides of the autonomous foods station 200 would be inaccessible, and may improve loading and cleaning efficiency.

The autonomous food station 200 may be further expanded to include additional groups of cubbies and additional internal transport systems arranged in side-by-side fashion. The increased capacity may allow the food partner 106 to provide additional un-ordered meals, snacks, desserts, side dishes, etc., to be loaded into the autonomous food station 200 for spontaneous purchasers, e.g., who find themselves hungrier than originally expected. The food station control logic of the autonomous food station 200 may prompt the customer to add to their pre-ordered purchase, for example with messages like "Would you like fries with that?," or "Would you like to add a dessert?" Such items not pre-ordered may carry a premium cost, due to the risk the food partner 106 may take that the food items spoil before sale, and/or to encourage customers 108 to order in advance.

Figure 24A:
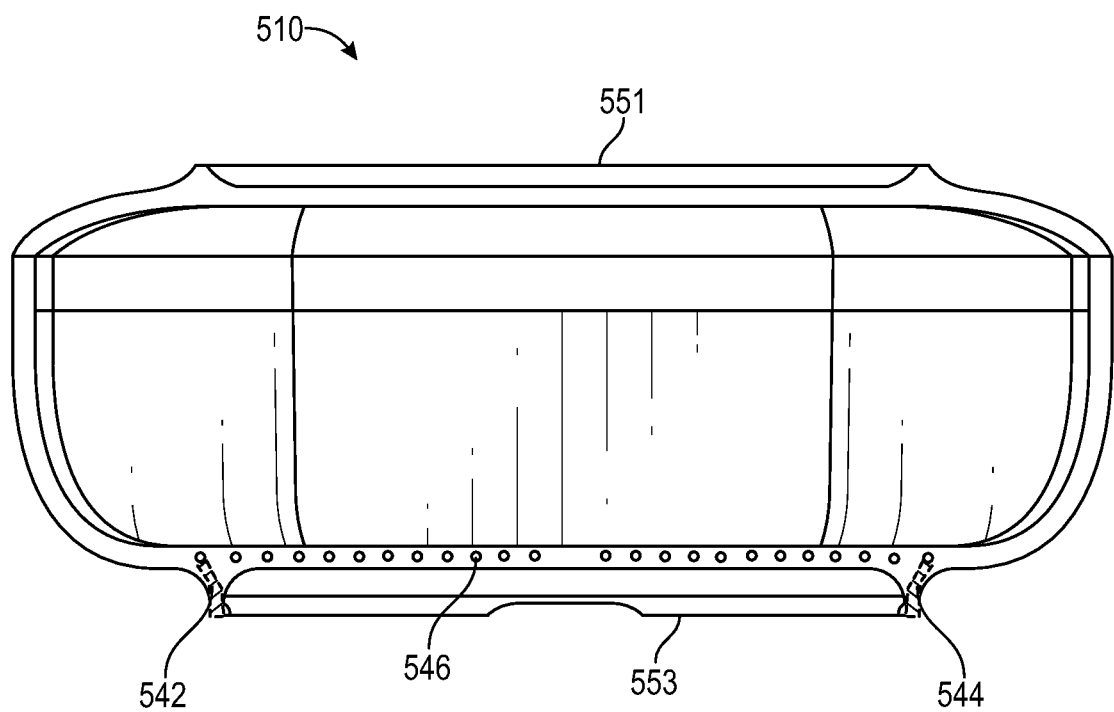
FIG. 24A is a cross-sectional view of a food portion container that may be used with an autonomous food station according to an example embodiment of the present invention.

FIG. 24A is a cross-sectional view of a food portion container 510 that may include a lid 551 and may be used with an autonomous food station according to an example embodiment of the present invention. In this alternative embodiment, a base 553 of the food portion container 510 may comprise a ceramic material and include mating electrically conductive contact features 542, 544 (e.g. that extend or protrude downwardly) to accept electrical power, with a conventional electrically resistive heating element 546 of the type used in conventional hot plates connected in series between the mating electrically conductive contact features. In this way, the bottom of the food portion container may function as a hot plate when enclosed within a cubby that can provide an electrical potential across the mating electrically conductive contact features 542, 544 of the food portion container 510.

Figure 24B:
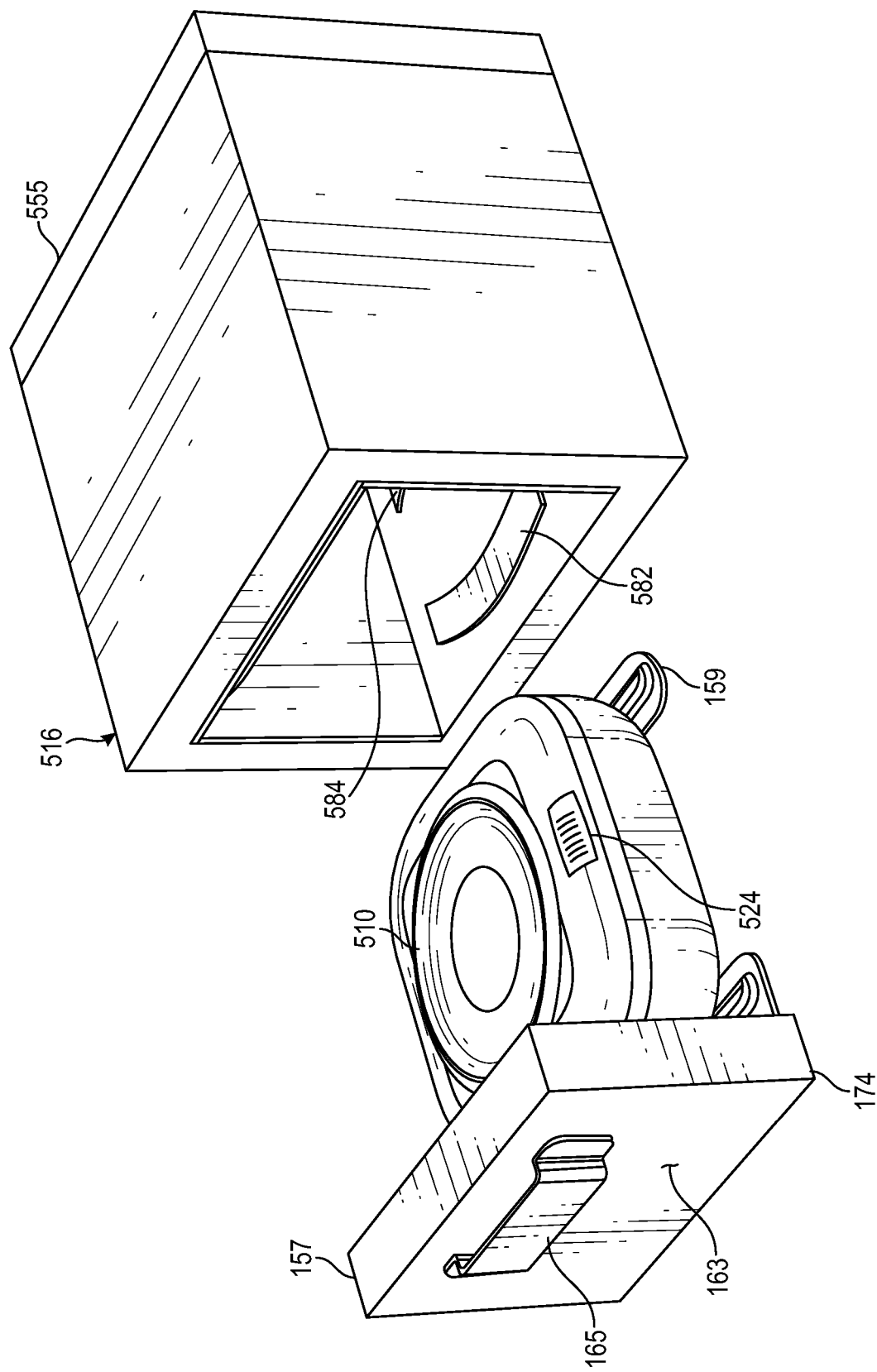
FIG. 24B is an exploded perspective view of a cubby of an autonomous food station according to another example embodiment of the present invention, and the food portion container of FIG. 24A, after opening the cubby from within the interior of the autonomous food station to remove the portion container carrier and portion container.

FIG. 24B is an exploded perspective view of a cubby 516 of an autonomous food station according to another example embodiment of the present invention, and the food portion container 510 of FIG. 24A, after opening the cubby 516 from within the interior of the autonomous food station to remove the portion container carrier 174 and portion container 510. Referring now additionally to FIG. 24B, the portion container carrier 174 includes a carrier plate 163 with front panel 157 and a handle 165, and a portion container support plate 159. In this alternative embodiment, the portion container support plate supports the entire weight of the food portion container 510 when the portion container carrier 174 and food portion container 510 are removed from within the cubby 516.

In the example embodiment of FIG. 24B, the floor of the cubby 516 may include first and second electrically conductive features 582, 584, which can make electrical contact with mating features 542, 544 on the base 553 of the food portion container 510 (when enclosed in the cubby 516), respectively. After establishment of the foregoing electrical contacts, the heating system of the autonomous food station may selectively provide an electrical potential between the first and second electrically conductive features 582, 584 to power a conventional electrically resistive heating element 546 embedded in the food portion container 510. Alternative geometric arrangements of the electrically conductive features are possible and practical and contemplated by this disclosure, so long as the electrical contacts are established when the food portion container 510 is inserted into the cubby 516 (e.g., conventional spring-loaded conductive pins contacting the bottom or sides of the food portion container 510).

Figure 24C:
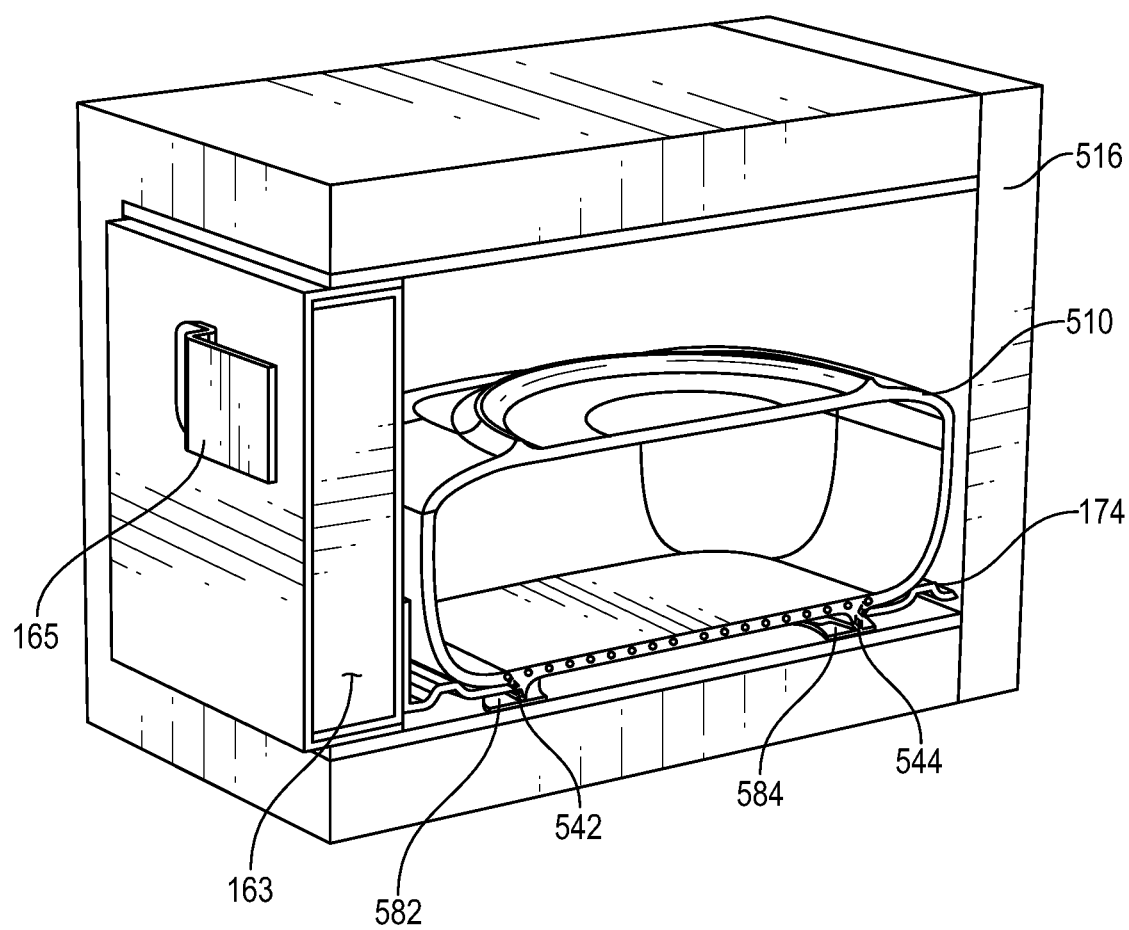
FIG. 24C is a cross-sectional view of a cubby of an autonomous food station according to an example embodiment of the present invention, in a closed state with the food portion container of FIG. 24A inside.

FIG. 24C is a cross-sectional view of the cubby 516, in a closed state with the food portion container 510 of FIG. 24A inside. Referring now additionally to FIG. 24C, the floor of the cubby 516 may include two electrically conductive features 582, 584, which can make electrical contact with mating features 542, 544 on the base 553 of the food portion container 510 (when enclosed in the cubby 516), e.g. to power an electrically resistive heating element 546 embedded in the food portion container 510. The heating system of the automated food station may selectively drive an electrical current via the first and second electrically conductive features 582, 584 through the resistive heating element 546 of the food portion container 510.

In the embodiment of FIG. 24C, the base 553 of the food portion container 510 may extend slightly below the portion container support plate 159 so that, when the portion container carrier 174 is inserted into the cubby 516, the mating electrically conductive features 542, 544 of the base 553 of the food portion container 510 will contact and rest upon the first and second electrically conductive features 582, 584 of the floor of the cubby 516, and the electrical contacts therebetween may then be maintained by gravity. The electrical contacts may be alternatively made and maintained by spring loaded pins, or other conventional means.

Alternatively, the electrically conductive contacts of cubby 516 may be eliminated entirely and replaced by a conventional electrically conductive coil, e.g., disposed in an insulative material of the floor of the cubby 516. For example, the insulative material may comprise a conventional insulative ceramic material. In that alternative embodiment, the heating system may selectively drive an oscillating electrical current through the conventional electrically conductive coil of the cubby, to induce an electric current through a conventional resistive heating element comprised by the food portion container. The electrical circuit of the food portion container that includes the conventional resistive heating element may also include a capacitor to tune its resonant frequency for improved inductive coupling. Such heating of conventional hot plates or kettles by electrical power transferred via inductive coupling is well known in the art, for example as disclosed in U.S. Pat. 4,996,405 to Poumey, et al., which patent is incorporated by reference into the present disclosure. The food portion container that is enclosed in the selected cubby herein may thusly be selectively heated by inductive coupling in an alternative embodiment of the heating system of the autonomous food station.

Figure 25:
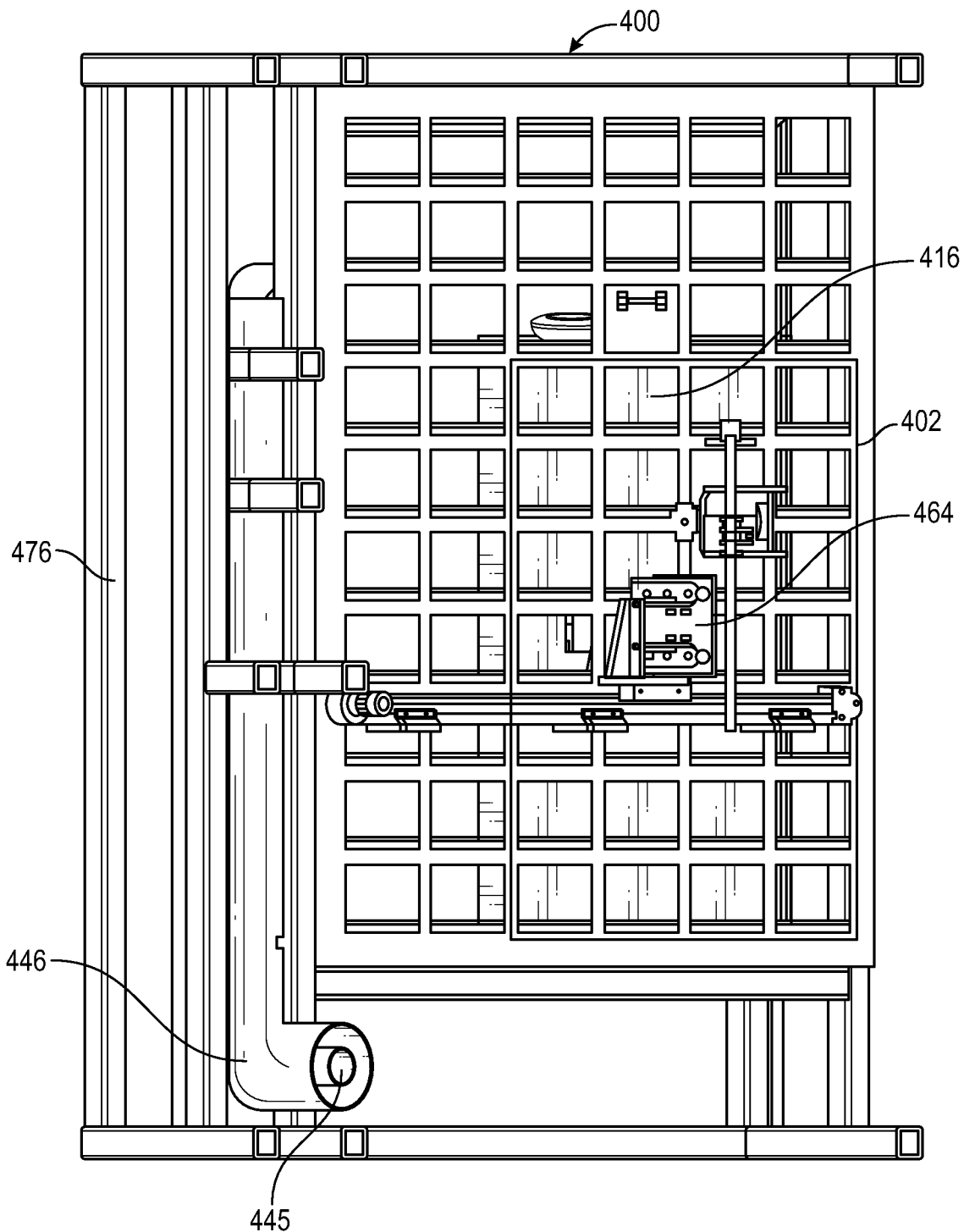
FIG. 25 is a perspective cross-sectional view of a portion of the interior of an autonomous food station according to another example embodiment of the present invention, showing a plurality of cooled cubbies.

FIG. 25 is a perspective cross-sectional view of the interior of an autonomous food station 400 according to another example embodiment of the present invention. The food station 400 includes a frame 476 supporting an array of cubbies including a subarray of group-cooled cubbies 402. In the example embodiment of FIG. 25, a heating system of the autonomous food station 400 may - but does not necessarily - perform heating in any or all of the depicted subarray of cooled cubbies 402. As used herein, a "cooled cubby" is a cubby that the cooling system can cool, but it does not need to have a below-ambient temperature and the system does not have to be removing heat from it at the time that it is considered and identified herein as a "cooled cubby." In a preferred embodiment, cooling of the subarray of cooled cubbies 402 is independent of any heating or cooling in any or all cubbies that reside outside the subarray of group-cooled cubbies 402.

The cooling system of the autonomous food station 400 preferably includes a blower and a thermally insulated air duct 445, 446, which can convey chilled air between an evaporator of a conventional air refrigeration system (e.g. disposed in base compartment 197 of FIG. 18) and the subarray of group-cooled cubbies 402. In the example embodiment of FIG. 25, the thermally insulated air duct 445, 446 is optionally a dual coaxial air duct with air flow towards the subarray of group-cooled cubbies 402 within an inner duct portion 445, and return air flow back to the evaporator within an outer duct portion 446. Such a coaxial arrangement may enhance space efficiency and reduce the quantity of needed thermal insulation. One or more of the group-cooled cubbies 402 optionally may also include a desiccant or other conventional means for decreasing the relative humidity of the air within that cubby.

Preferably an internal transport system 464 of the autonomous food station 400 can move a portion container carrier of a selected one of cooled cubbies 402 (e.g. cubby 416) to a selected heating cubby to heat a food portion container according to a heating schedule, or directly to the collection hatch 113 if the food is intended to be served unheated.

In the foregoing specification, the invention is described with reference to specific exemplary embodiments, but those skilled in the art will recognize that the invention is not limited to those. For example, the word "preferably" is used herein to consistently include the meaning of "not necessarily" or optionally. "Comprising," "including," and "having," are intended to be open-ended terms. It is also contemplated that various features and aspects of the invention may be used individually or jointly and possibly in a different environment or application, and various changes in form and detail may be made without departing from the spirit and scope of the invention. The specification and drawings are, accordingly, to be regarded as illustrative and exemplary rather than restrictive, and the invention should be limited only according to the following claims, including all equivalent interpretation to which they are entitled.

We claim:

1. A food station comprising:
  a plurality of cubby enclosures, each cubby enclosure sized to enclose a food portion container and accept a portion container carrier that can hold the food portion container;
  a collection hatch large enough for the food portion container to pass therethrough, the collection hatch being externally accessible;
  a heating system that can controllably heat the food portion container within a selected one of the plurality of cubby enclosures, independently of an operation of the heating system in one or more other cubby enclosures of the plurality of cubby enclosures;
  a cooling system that can perform cooling within at least the selected cubby enclosure of the plurality of cubby enclosures;
  an internal transport system including an end effector that temporarily couples to the portion container carrier of the selected cubby enclosure and controllably moves the food portion container carrier within the food station to the collection hatch; and
  a control system that controls the heating and controls the movement of the internal transport system, the control system including a memory containing stored information used by the control system.

2. The food station of claim 1 wherein the cooling system can cool more than one of the plurality of cubby enclosures.

3. The food station of claim 1 wherein the portion container carrier includes front plate with a handle for coupling to the end effector.

4. The food station of claim 1 wherein the collection hatch includes an external shutter that can be actuated by the control system to selectively control the external accessibility of the collection hatch.

5. The food station of claim 4 wherein the collection hatch includes an internal shutter that can be actuated by the control system to selectively deny access from the collection hatch to an interior of the food station while the external shutter is open.

6. The food station of claim 1 wherein internal transport system includes controllable mechanical actuators that translate the end effector in three orthogonal directions, each forming an axis of a Cartesian coordinate system.

7. The food station of claim 1 wherein the stored information includes a heating instruction corresponding to the food portion container.

8. The food station of claim 1 wherein the stored information includes a scheduled time for collection of the food portion container by a customer.

9. The food station of claim 8 wherein the stored information includes a key for customer identity verification.

10. The food station of claim 1 further comprising communication electronics capable of receiving information via the internet, and the stored information includes information received via the internet.

11. The food station of claim 1 further comprising a label scanner, the stored information including information read by the label scanner from a label on the food portion container.

12. The food station of claim 11 wherein the internal transport system controllably moves the food portion container carrier within the food station to an internal identification site that includes the label scanner.

13. The food station of claim 1 wherein the selected cubby enclosure includes first and second electrically conductive features that are configured to contact mating electrically conductive features of the food portion container when it is enclosed within the selected cubby enclosure, the heating system selectively providing an electrical potential between the first and second electrically conductive features.

14. The food station of claim 13 wherein the heating system selectively drives an electrical current via the first and second electrically conductive features through a resistive heating element of the food portion container.

15. The food station of claim 13 wherein a floor of the selected cubby enclosure includes the first and second electrically conductive features, and a bottom of the food portion container includes the mating electrically conductive features, and electrical contact therebetween is maintained by gravity.

16. The food station of claim 1 wherein the selected cubby enclosure includes an electrically conductive coil and the heating system selectively drives a current through the electrically conductive coil to induce an electric current through a resistive heating element of the food portion container, thereby selectively heating the food portion container by inductive coupling.

* * * * *